(12) United States Patent
Takenouchi

(10) Patent No.: US 9,820,070 B2
(45) Date of Patent: Nov. 14, 2017

(54) ELECTRONIC DEVICE

(71) Applicant: KYOCERA CORPORATION, Kyoto (JP)

(72) Inventor: Hayato Takenouchi, Kizugawa-shi (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 15/188,883

(22) Filed: Jun. 21, 2016

(65) Prior Publication Data
US 2016/0381480 A1     Dec. 29, 2016

(30) Foreign Application Priority Data

Jun. 26, 2015  (JP) ................. 2015-128440

(51) Int. Cl.
| | | |
|---|---|---|
| *H04R 29/00* | (2006.01) | |
| *H04M 1/60* | (2006.01) | |
| *H04M 1/19* | (2006.01) | |

(52) U.S. Cl.
CPC ........ *H04R 29/004* (2013.01); *H04M 1/6008* (2013.01); *H04M 1/6016* (2013.01); *H04M 1/19* (2013.01); *H04R 2499/11* (2013.01)

(58) Field of Classification Search
CPC .. H04R 29/004; H04R 2499/11; G01H 15/00; H04M 1/19; H04M 1/6008; H04M 1/6016
USPC ............................. 381/58, 60, 345, 312, 315
See application file for complete search history.

(56) References Cited

U.S. PATENT DOCUMENTS

| | | | | |
|---|---|---|---|---|
| 9,532,139 | B1* | 12/2016 | Lu ........................... | H04R 3/005 |
| 2004/0202333 | A1* | 10/2004 | Csermak .............. | H04R 25/305 |
| | | | | 381/60 |
| 2009/0245565 | A1* | 10/2009 | Mittleman ............ | H04M 1/035 |
| | | | | 381/365 |
| 2014/0140558 | A1* | 5/2014 | Kwong ................. | H04R 3/007 |
| | | | | 381/345 |

FOREIGN PATENT DOCUMENTS

JP      2010-119968 A      6/2010

* cited by examiner

*Primary Examiner* — Vivian Chin
*Assistant Examiner* — Friedrich W Fahnert
(74) *Attorney, Agent, or Firm* — Duane Morris LLP

(57) ABSTRACT

At least one processor can detect a volume of a sound input to an upper microphone. The at least one processor can determine whether or not at least one of a sound emission hole for a rear speaker and a sound collection hole for the upper microphone is clogged, based on the detected volume. The at least one processor can give a notification about a result of determination.

12 Claims, 24 Drawing Sheets

ELECTRONIC DEVICE

CROSS-REFERENCE TO RELATED APPLICATION

The present application claims priority under 35 U.S.C. §119 to Japanese Patent Application No. 2015-128440 filed on Jun. 26, 2015, entitled "Electronic Device." The content of which is incorporated by reference herein in its entirety.

FIELD

The present disclosure relates to an electronic device.

BACKGROUND

An electronic device having a cleaning function for removing contamination has conventionally been known. For example, an electronic device has a housing having a waterproof function, a functional device provided in the housing, an ultrasound generation device, and an ultrasound emission port provided at a position adjacent to the ultrasound generation device in a frame of the housing.

SUMMARY

An electronic device in one embodiment includes a microphone, a speaker, a sound collection hole for the microphone, a sound emission hole for the speaker, a detector configured to detect a volume of a sound input to the microphone, a determination unit configured to determine whether or not at least one of a sound emission hole for the speaker and a sound collection hole for the microphone is clogged, based on the detected volume, and a notification unit configured to give a notification about a result of determination.

DETAILED DESCRIPTION

Embodiments will be described below with reference to the drawings.

[First Embodiment]

Figure 1:
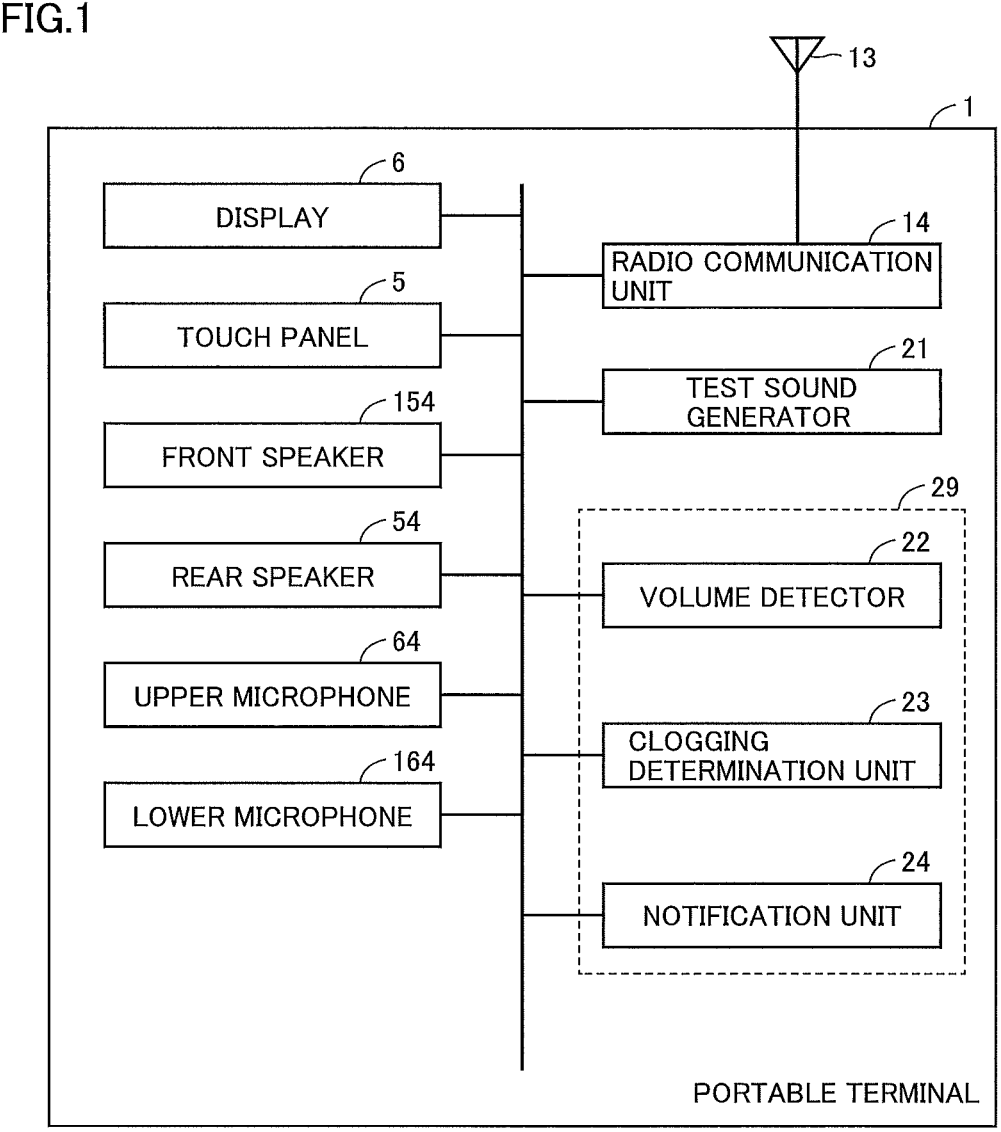
FIG. 1 is a diagram showing a configuration of a portable terminal in a first embodiment.

FIG. 1 is a diagram showing a configuration of a portable terminal 1 in a first embodiment.

As shown in FIG. 1, portable terminal 1 includes a touch panel 5, a display 6, a front speaker 154, a rear speaker 54, an upper microphone 64, a lower microphone 164, an antenna 13, a radio communication unit 14, a test sound generator 21, a volume detector 22, a clogging determination unit 23, and a notification unit 24.

Radio communication unit 14 can establish communication with a radio base station through antenna 13. Radio communication unit 14 can include an analog to digital (A/D) converter, a digital to analogue (D/A) converter, a modulator, a demodulator, a frequency converter, and an amplifier.

Display 6 can display a screen. Display 6 is implemented, for example, by a liquid crystal display or an organic electro-luminescence (EL) display.

Touch panel 5 can function as an input acceptance unit which accepts an input from a user. Though touch panel 5 detects contact or proximity of an object (such as a finger of a user or a pen) in accordance with a capacitance, touch panel 5 is not limited as such, and an input from a user may be detected, for example, based on infrared rays or electromagnetic induction.

Front speaker 154 and rear speaker 54 are implemented, for example, by an electromagnetic speaker. Front speaker 154 and rear speaker 54 can output voice and sound of a communication counterpart of portable terminal 1, voice and sound generated by an application, or a test sound which will be described later.

Voice and sound of a user of portable terminal 1 and noise around portable terminal 1 are input to upper microphone 64 and lower microphone 164.

Test sound generator 21 can generate a test sound.

Volume detector 22 can detect a volume of a sound input to upper microphone 64 or lower microphone 164. The volume represents, for example, an average value for a certain period of time of amplitude of waveforms of audio signals generated by upper microphone 64 and lower microphone 164, and is quantified in a unit such as decibel.

Clogging determination unit 23 can determine whether or not at least one of a sound emission hole for rear speaker 54 and a sound collection hole for upper microphone 64 is clogged with an adherent substance, based on the detected volume.

Notification unit 24 can have display 6 show a result of determination by clogging determination unit 23. Notification unit 24 can also have display 6 show a method of removing clogging when determination as clogging is made by clogging determination unit 23.

At least one processor 29 can implement functions of volume detector 22, clogging determination unit 23, and notification unit 24. In accordance with various embodiments, the at least one processor may be implemented as a single integrated circuit (IC) or as multiple communicatively coupled IC's and/or discrete circuits. It is appreciated that the at least one processor can be implemented in accordance with various known technologies. In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

Figure 2:
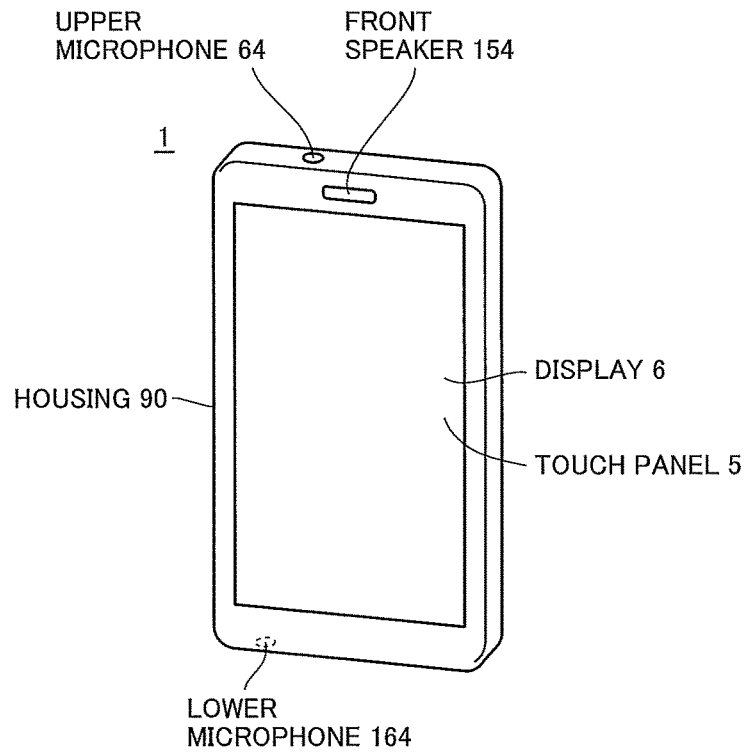
FIG. 2 is a front view of the portable terminal.
Figure 3:
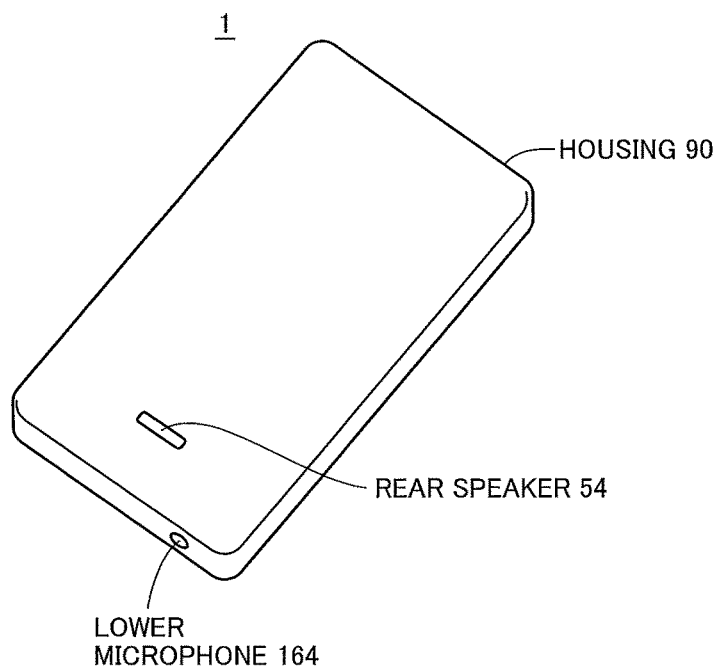
FIG. 3 is a rear view of the portable terminal

FIG. 2 is a front view of portable terminal 1. FIG. 3 is a rear view of portable terminal 1

Referring to FIGS. 2 and 3, upper microphone 64 is located on an upper side of a side surface of a housing 90. Lower microphone 164 is located on a lower side of a side surface of housing 90. Front speaker 154 is located on an upper side of a front surface of housing 90. Rear speaker 54 is located on a lower side of a rear surface of housing 90.

In a normal telephone conversation mode, front speaker 154 and lower microphone 164 are turned on. Voice and sound through lower microphone 164 is transmitted to a conversation counterpart side and received voice and sound on a counterpart side is output from front speaker 154.

In a handsfree telephone conversation mode, rear speaker 54 and upper microphone 64 are turned on. Voice and sound through upper microphone 64 is transmitted to the conversation counterpart side and received voice and sound on the counterpart side is output from rear speaker 54.

Figure 4:
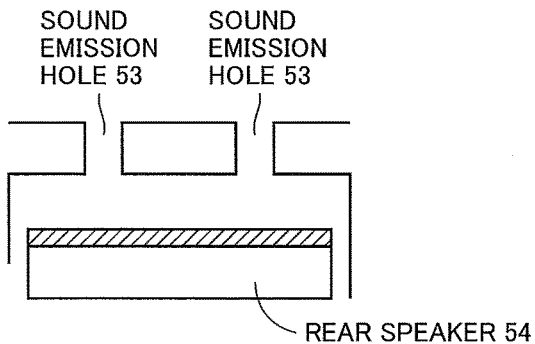
FIG. 4 is a diagram showing a rear speaker and a sound emission hole for the rear speaker.

FIG. 4 is a diagram showing rear speaker 54 and a sound emission hole 53 for rear speaker 54.

Rear speaker 54 is located on an inner side of housing 90 of portable terminal 1. Rear speaker 54 is located at a position facing sound emission hole 53 in housing 90.

Figure 5:
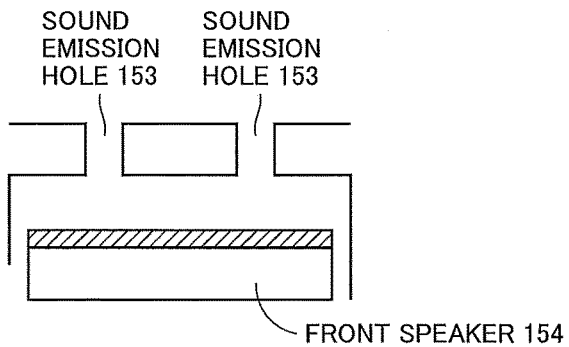
FIG. 5 is a diagram showing a front speaker and a sound emission hole for the front speaker.

FIG. 5 is a diagram showing front speaker 154 and a sound emission hole 153 for front speaker 154.

Front speaker 154 is located on the inner side of housing 90 of portable terminal 1. Front speaker 154 is located at a position facing sound emission hole 153 provided in housing 90.

Figure 6:
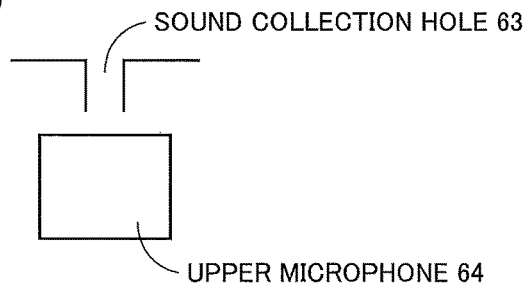
FIG. 6 is a diagram showing an upper microphone and a sound collection hole for the upper microphone.

FIG. 6 is a diagram showing upper microphone 64 and a sound collection hole 63 for upper microphone 64.

Upper microphone 64 is located on the inner side of housing 90 of portable terminal 1. Upper microphone 64 is located at a position facing sound collection hole 63 in housing 90.

Figure 7:
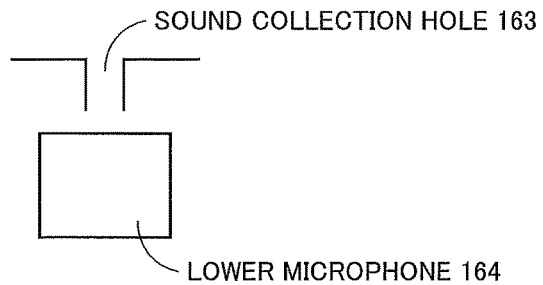
FIG. 7 is a diagram showing a lower microphone and a sound collection hole for the lower microphone.

FIG. 7 is a diagram showing lower microphone 164 and a sound collection hole 163 for lower microphone 164.

Lower microphone 164 is located on the inner side of housing 90 of portable terminal 1. Lower microphone 164 is located at a position facing sound collection hole 163 in housing 90.

Figure 8:
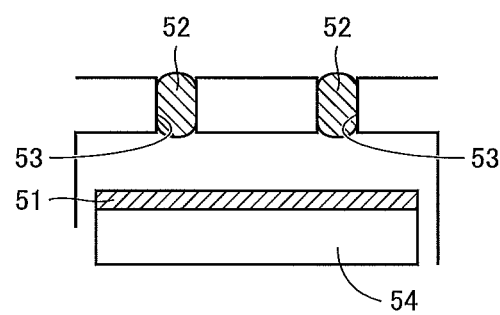
FIG. 8 is a diagram showing a state that the sound emission hole for the rear speaker is clogged.

FIG. 8 is a diagram showing a state that sound emission hole 53 for rear speaker 54 is clogged with an adherent substance.

Sound emission hole 53 located to face rear speaker 54 may be clogged with an adherent substance. For example, when portable terminal 1 is used under the sea and moisture of sea water evaporates, salt in sea water is deposited and the salt may clog, for example, sound emission hole 53. In addition, when portable terminal 1 is washed with such a detergent as soap and moisture evaporates, a component in the detergent (such as a soap residue) is deposited and that component may clog, for example, sound emission hole 53. When sound emission hole 53 is clogged with the adherent substance, sound output from rear speaker 54 is output to the outside of housing 90 with a volume being attenuated.

Similarly, sound emission hole 153 for front speaker 154 may be clogged with an adherent substance such as salt or a component in a detergent. When sound emission hole 153 is clogged with an adherent substance, sound output from front speaker 154 is output to the outside of housing 90 with a volume being attenuated.

Figure 9:
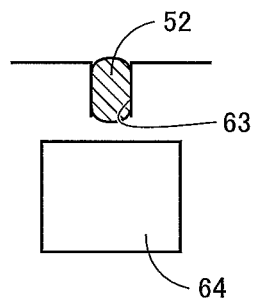
FIG. 9 is a diagram showing a state that the sound collection hole for the upper microphone is clogged.

FIG. 9 is a diagram showing a state that sound collection hole 63 for upper microphone 64 is clogged.

Sound collection hole 63 located to face upper microphone 64 may be clogged with an adherent substance. When sound collection hole 63 is clogged, a sound outside housing 90 is input to upper microphone 64 with a volume being attenuated.

Similarly, sound collection hole 163 for lower microphone 164 may be clogged with an adherent substance 52. When sound collection hole 163 is clogged, sound outside housing 90 is input to lower microphone 164 with a volume being attenuated.

Figure 10:
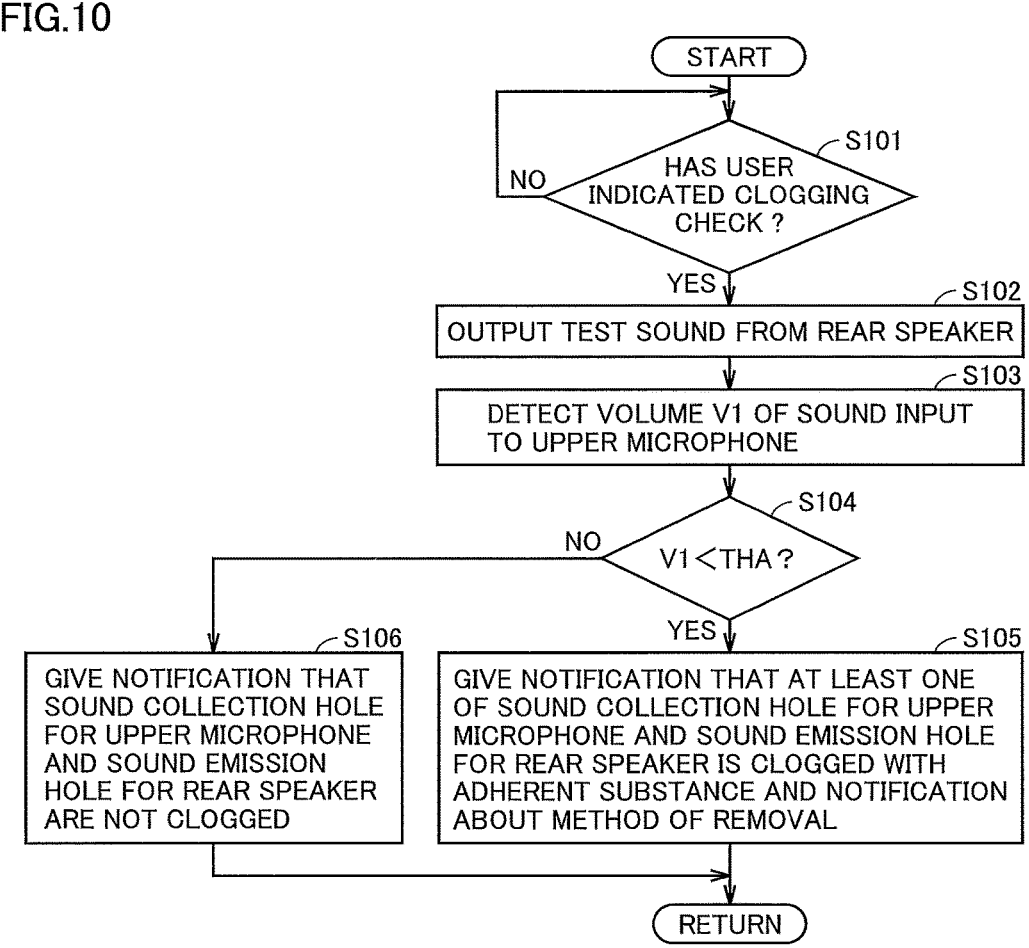
FIG. 10 is a flowchart showing a procedure of operations of the portable terminal in the first embodiment.
Figure 11:
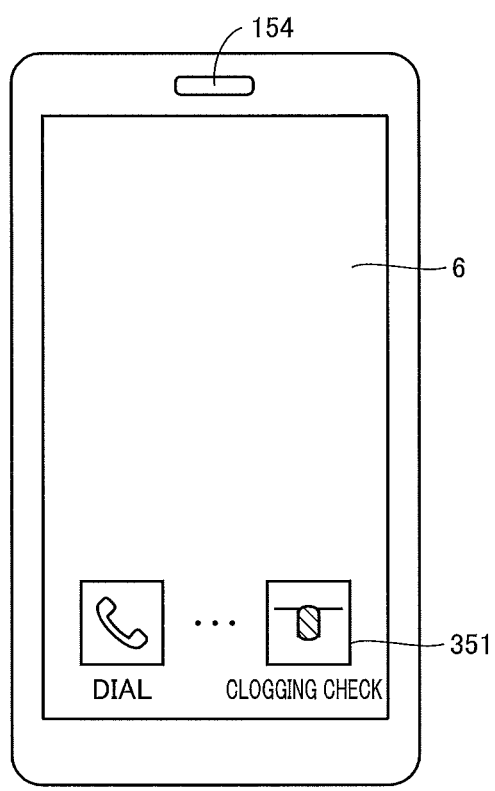
FIG. 11 is a diagram showing an icon for a user to indicate clogging check.
Figure 12:
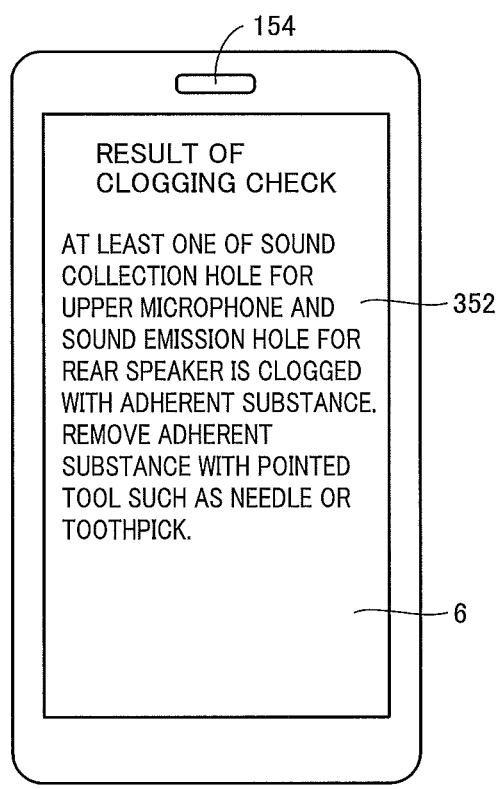
FIGS. 12 and 13 are diagrams showing examples of results of clogging check.
Figure 13:
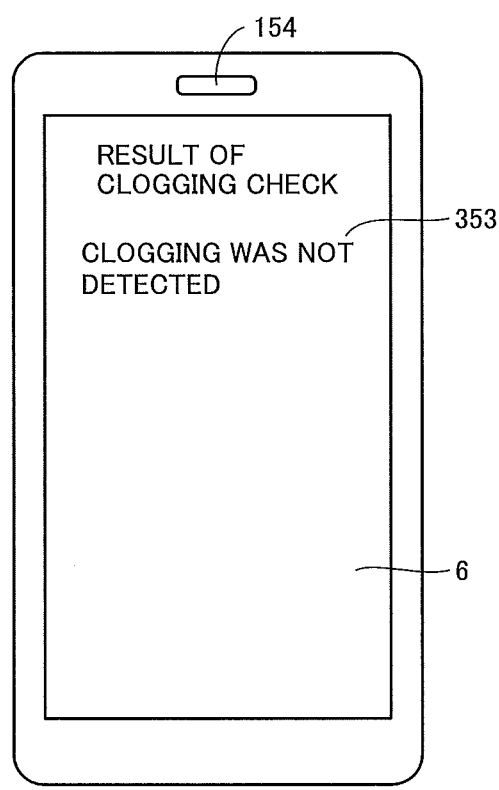

FIG. 10 is a flowchart showing a procedure of operations of portable terminal 1 in the first embodiment. FIG. 11 is a diagram showing an icon for a user to indicate clogging check. FIGS. 12 and 13 are diagrams showing examples of results of clogging check.

Referring to FIG. 10, when a user indicates clogging check in step S101 by selecting a clogging check icon 351 displayed on display 6 as shown in FIG. 11 through touch panel 5, the process proceeds to step S102.

In step S102, test sound generator 21 can generate a test sound at a certain volume and can have rear speaker 54 output the test sound.

In step S103, volume detector 22 can detect a volume V1 of the sound input to upper microphone 64 during a period in which the test sound is output.

When volume V1 is lower than a prescribed threshold value THA in step S104, the process proceeds to step S105, and when volume V1 is equal to or higher than prescribed threshold value THA, the process proceeds to step S106.

In step S105, as shown in FIG. 12, notification unit 24 can have display 6 show a message 352 giving a notification that at least one of sound collection hole 63 for upper microphone 64 and sound emission hole 53 for rear speaker 54 is clogged with an adherent substance and a notification about a method of removing the adherent substance which is the cause of clogging. Removal with a pointed tool such as a needle or a toothpick may be indicated, for example, as shown in FIG. 12, as a method of removing clogging.

In step S106, as shown in FIG. 13, notification unit 24 can have display 6 show a message 353 giving a notification that sound collection hole 63 for upper microphone 64 and sound emission hole 53 for rear speaker 54 are not clogged.

As set forth above, according to the portable terminal in the first embodiment, upper microphone 64 detects the test sound output from rear speaker 54 so that whether or not at least one of sound collection hole 63 for upper microphone 64 and sound emission hole 53 for rear speaker 54 is clogged with an adherent substance can be detected.

[Modification of First Embodiment]

Though clogging of sound emission hole 53 for rear speaker 54 and sound collection hole 63 for upper microphone 64 is determined in the first embodiment, limitation thereto is not intended.

Clogging of sound emission hole 53 for rear speaker 54 and sound collection hole 163 for lower microphone 164 may be determined. In this case, in step S103 in FIG. 10, volume detector 22 should only detect a volume of a sound input to lower microphone 164, instead of a volume of a sound input to upper microphone 64.

Alternatively, clogging of sound emission hole 153 for front speaker 154 and sound collection hole 63 for upper microphone 64 may be determined. In this case, in step S102 in FIG. 10, test sound generator 21 should only generate a test sound at a certain volume and have front speaker 154 output the test sound, instead of rear speaker 54.

Alternatively, clogging of sound emission hole 153 for front speaker 154 and sound collection hole 163 for lower microphone 164 may be determined.

[Second Embodiment]

The portable terminal in a second embodiment allows a user to select a portion to be checked for clogging.

A user can select one microphone from two microphones and one speaker from two speakers, through touch panel 5.

Test sound generator 21 can have the selected speaker output a test sound.

Volume detector 22 can detect a volume of a sound input to the selected microphone.

Clogging determination unit 23 can determine whether or not at least one of the sound emission hole for the selected speaker and the sound collection hole for the selected microphone is clogged, based on the detected volume.

Figure 14:
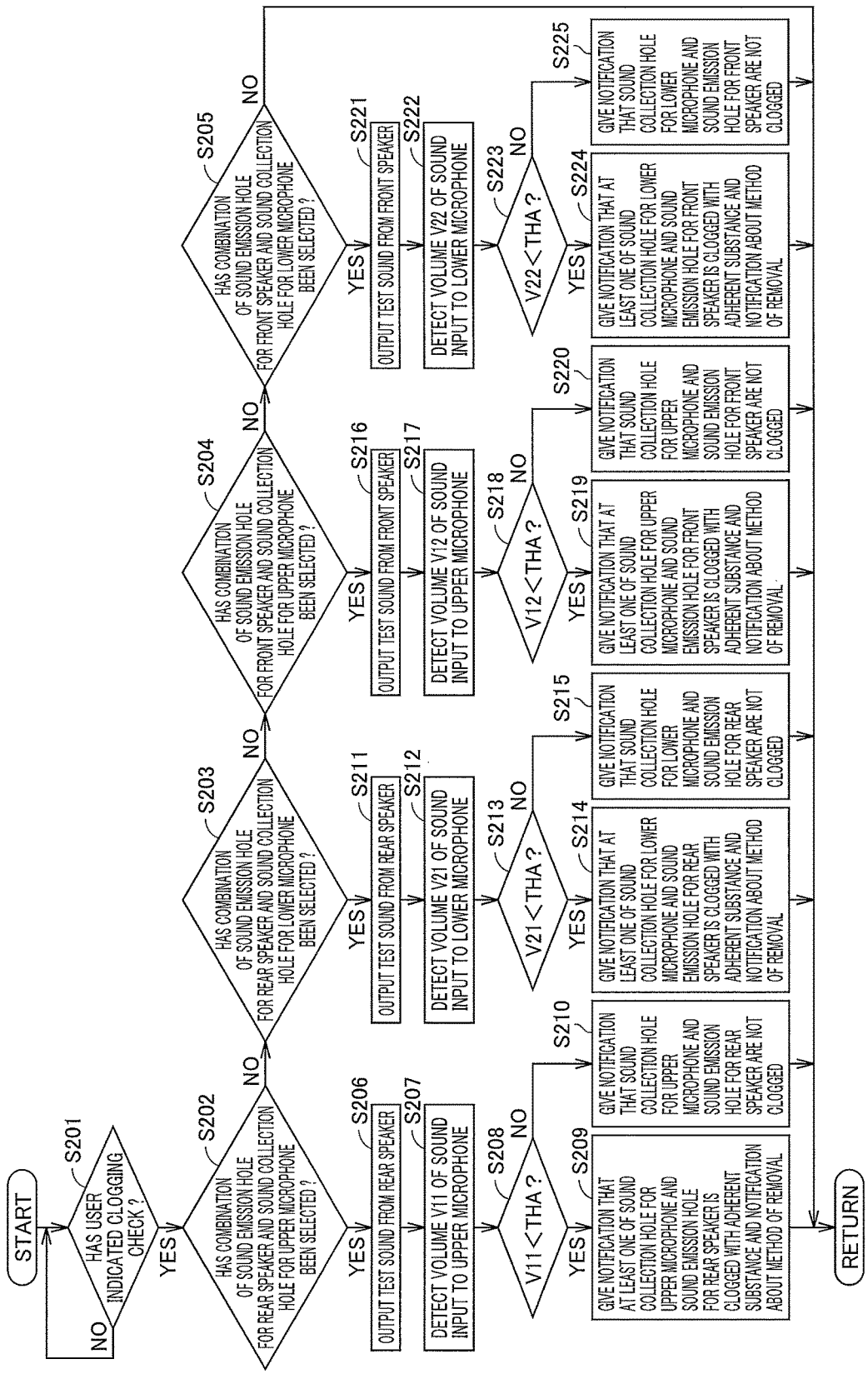
FIG. 14 is a flowchart showing a procedure of operations of the portable terminal in a second embodiment.
Figure 15:
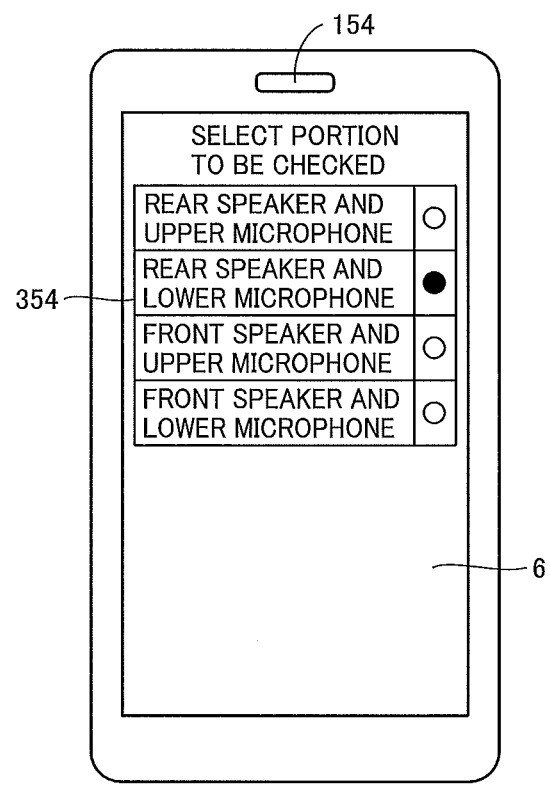
FIG. 15 is a diagram showing a screen for a user to select a combination of portions to be checked for clogging.

FIG. 14 is a flowchart showing a procedure of operations of portable terminal 1 in the second embodiment. FIG. 15 is a diagram showing a menu screen 354 for a user to select a combination of portions to be checked for clogging.

Referring to FIG. 14, when the user indicates clogging check in step S201 by selecting a clogging check icon displayed on display 6 through touch panel 5, the process proceeds to step S202.

When the user selects a combination of sound emission hole 53 for rear speaker 54 and sound collection hole 63 for upper microphone 64 to be checked for clogging in step S202, the process proceeds to step S206.

When the user selects a combination of sound emission hole 53 for rear speaker 54 and sound collection hole 163 for lower microphone 164 to be checked for clogging in step S203 as shown in FIG. 15, the process proceeds to step S211.

When the user selects a combination of sound emission hole 153 for front speaker 154 and sound collection hole 63 for upper microphone 64 to be checked for clogging in step S204, the process proceeds to step S216.

When the user selects a combination of sound emission hole 153 for front speaker 154 and sound collection hole 163 for lower microphone 164 to be checked for clogging in step S205, the process proceeds to step S221.

In step S206, test sound generator 21 can generate a test sound at a certain volume and can have rear speaker 54 output the test sound.

In step S207, volume detector 22 can detect a volume V11 of a sound input to upper microphone 64 during a period in which the test sound is output.

When volume V11 is lower than prescribed threshold value THA in step S208, the process proceeds to step S209, and when volume V11 is equal to or higher than prescribed threshold value THA, the process proceeds to step S210.

In step S209, notification unit 24 can have display 6 show a message giving a notification that at least one of sound collection hole 63 for upper microphone 64 and sound emission hole 53 for rear speaker 54 is clogged with salt or a soap residue and a notification about a method of removing clogging.

In step S210, notification unit 24 can have display 6 show a message giving a notification that sound collection hole 63 for upper microphone 64 and sound emission hole 53 for rear speaker 54 are not clogged.

In step S211, test sound generator 21 can generate a test sound at a certain volume and can have rear speaker 54 output the test sound.

In step S212, volume detector 22 can detect a volume V21 of a sound input to lower microphone 164 during a period in which the test sound is output.

When volume V21 is lower than prescribed threshold value THA in step S213, the process proceeds to step S214, and when volume V21 is equal to or higher than prescribed threshold value THA, the process proceeds to step S215.

In step S214, notification unit 24 can have display 6 show a message giving a notification that at least one of sound collection hole 163 for lower microphone 164 and sound emission hole 53 for rear speaker 54 is clogged with an adherent substance and a notification about a method of removing clogging.

In step S215, notification unit 24 can have display 6 show a message giving a notification that sound collection hole 163 for lower microphone 164 and sound emission hole 53 for rear speaker 54 are not clogged.

In step S216, test sound generator 21 can generate a test sound at a certain volume and can have front speaker 154 output the test sound.

In step S217, volume detector 22 can detect a volume V12 of a sound input to upper microphone 64 during a period in which the test sound is output.

When volume V12 is lower than prescribed threshold value THA in step S218, the process proceeds to step S219, and when volume V12 is equal to or higher than prescribed threshold value THA, the process proceeds to step S220.

In step S219, notification unit 24 can have display 6 show a message giving a notification that at least one of sound collection hole 63 for upper microphone 64 and sound emission hole 153 for front speaker 154 is clogged with an adherent substance and a notification about a method of removing clogging.

In step S220, notification unit 24 can have display 6 show a message giving a notification that sound collection hole 63 for upper microphone 64 and sound emission hole 153 for front speaker 154 are not clogged.

In step S221, test sound generator 21 can generate a test sound at a certain volume and can have front speaker 154 output the test sound.

In step S222, volume detector 22 can detect a volume V22 of a sound input to lower microphone 164 during a period in which the test sound is output.

When volume V22 is lower than prescribed threshold value THA in step S223, the process proceeds to step S224, and when volume V22 is equal to or higher than prescribed threshold value THA, the process proceeds to step S225.

In step S224, notification unit 24 can have display 6 show a message giving a notification that at least one of sound collection hole 163 for lower microphone 164 and sound emission hole 153 for front speaker 154 is clogged with an adherent substance and a notification about a method of removing clogging.

In step S225, notification unit 24 can have display 6 show a message giving a notification that sound collection hole 163 for lower microphone 164 and sound emission hole 153 for front speaker 154 are not clogged.

As set forth above, the portable terminal in the second embodiment can detect whether or not at least one of the sound collection hole for the selected microphone and the sound emission hole for the selected speaker is clogged with an adherent substance by detecting a test sound output from the speaker selected from a plurality of speakers with a microphone selected from a plurality of microphones. Though clogging of the sound collection hole for the microphone and the sound emission hole for the selected speaker is checked in response to an operation by a user in the present embodiment, the present disclosure is not limited thereto, and for example, the portable terminal may automatically perform the flow in FIG. 14. In that case, regarding the timing to output a test sound, checking may automatically be started, for example, in an environment in which a sound may be output (for example, at the time of activation of the alarm set by a user).

A portion where clogging has been caused can be specified by outputting a test sound based on selection in S202 to S205 in FIG. 14. For example, after a result is obtained in S210 (no clogging in the sound collection hole for the upper microphone and the sound emission hole for the rear speaker) after 5202 and thereafter a result is obtained in S214 (the sound collection hole for the lower microphone or the sound emission hole for the rear speaker is clogged) after 5203, clogging of the lower microphone is specified. Thus, a portion where clogging has been caused can preferably be specified by performing any two or more of steps S202 to S205 in the flowchart in FIG. 14.

[Third Embodiment]

In an electronic device in a third embodiment, a clogged portion is narrowed down by using both of a volume of a sound input to upper microphone 64 and a volume of a sound input to lower microphone 164.

Volume detector 22 can detect volume V1 of a sound input to upper microphone 64 and detect volume V2 of a sound input to lower microphone 164 during a period in which the test sound is output.

When volume V1 is lower than prescribed threshold value THA and volume V2 is equal to or higher than prescribed threshold value THA, clogging determination unit 23 can determine that sound collection hole 63 for upper microphone 64 is clogged (a pattern A).

When volume V1 is equal to or higher than prescribed threshold value THA and volume V2 is lower than prescribed threshold value THA, clogging determination unit 23 can determine that sound collection hole 163 for lower microphone 164 is clogged (a pattern B).

When volume V1 is lower than prescribed threshold value THA and volume V2 is lower than prescribed threshold value THA, clogging determination unit 23 can determine that at least one of a first pattern (a pattern C) in which both of sound collection hole 63 for upper microphone 64 and sound collection hole 163 for lower microphone 164 are clogged and a second pattern (a pattern D) in which sound emission hole 53 for rear speaker 54 is clogged is established.

Figure 16:
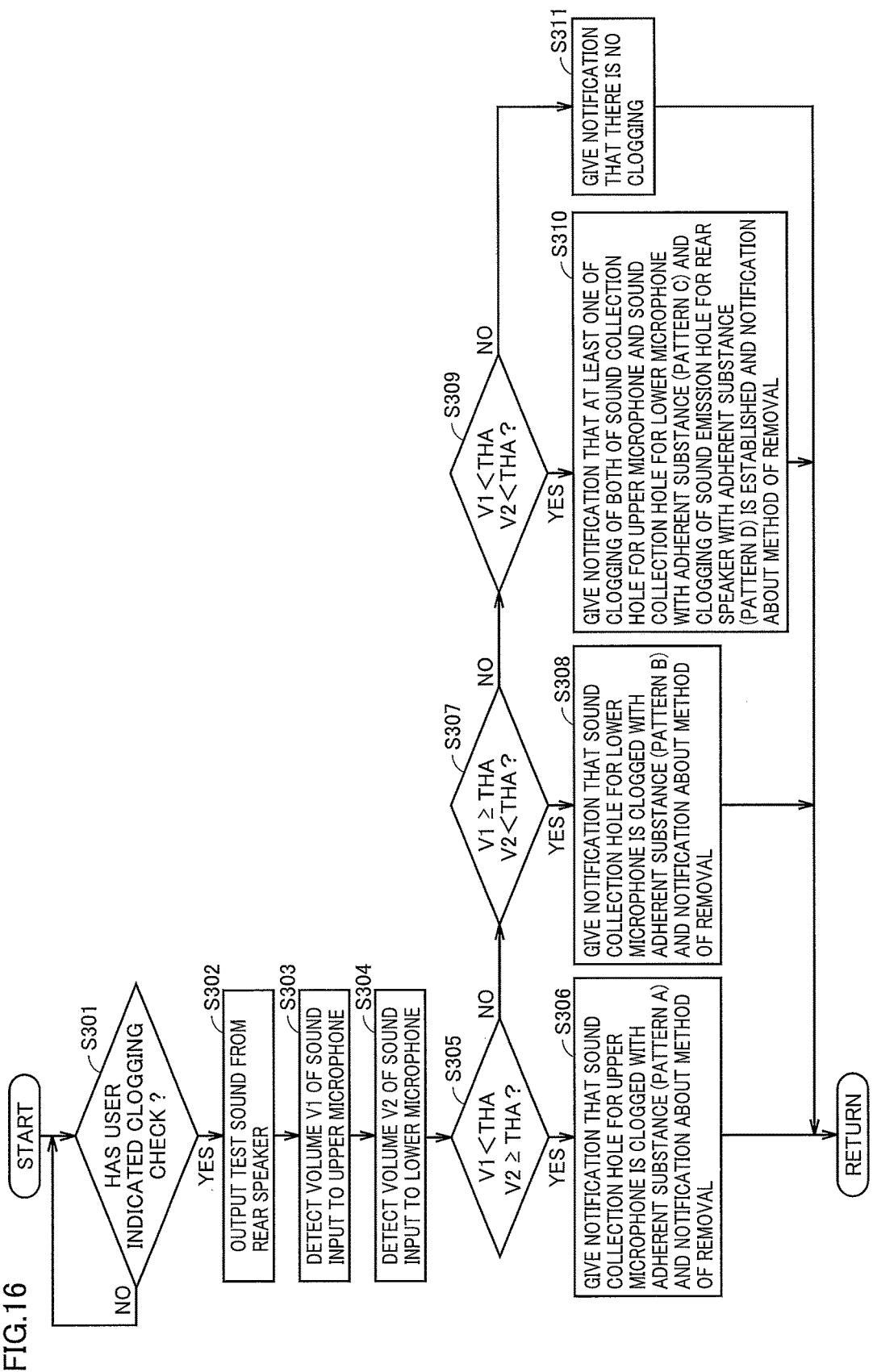
FIG. 16 is a flowchart showing a procedure of operations of the portable terminal in a third embodiment.

FIG. 16 is a flowchart showing a procedure of operations of portable terminal 1 in the third embodiment.

When a user indicates clogging check in step S301 by selecting a clogging check icon displayed on display 6 through touch panel 5, the process proceeds to step S302.

In step S302, test sound generator 21 can generate a test sound and can have rear speaker 54 output the test sound.

In step S303, volume detector 22 can detect volume V1 of a sound input to upper microphone 64.

In step S304, volume detector 22 can detect volume V2 of a sound input to lower microphone 164.

When volume V1 is lower than prescribed threshold value THA and volume V2 is equal to or higher than prescribed threshold value THA in step S305, the process proceeds to step S306.

In step S306, notification unit 24 can have display 6 show a message giving a notification that sound collection hole 63 for upper microphone 64 is clogged with an adherent substance (pattern A) and a notification about a method of removing clogging.

When volume V1 is equal to or higher than prescribed threshold value THA and volume V2 is lower than prescribed threshold value THA in step S307, the process proceeds to step S308.

In step S308, notification unit 24 can have display 6 show a message giving a notification that sound collection hole 163 for lower microphone 164 is clogged with an adherent substance (pattern B) and a notification about a method of removing clogging.

When volume V1 is lower than prescribed threshold value THA and volume V2 is lower than prescribed threshold value THA in step S309, the process proceeds to step S310.

In step S310, notification unit 24 can have display 6 show a message giving a notification that at least one of clogging of sound collection hole 63 for upper microphone 64 and sound collection hole 163 for lower microphone 164 with an adherent substance (pattern C) and clogging of sound emission hole 53 for rear speaker 54 with an adherent substance (pattern D) is established and a notification about a method of removing clogging.

When volume V1 is equal to or higher than prescribed threshold value THA and volume V2 is equal to or higher than prescribed threshold value THA in step S309, the process proceeds to step S311.

In step S311, notification unit 24 can have display 6 show a message giving a notification that sound collection hole 63 for upper microphone 64, sound collection hole 163 for lower microphone 164, and sound emission hole 53 for rear speaker 54 are not clogged.

As set forth above, according to the third embodiment, whether sound collection hole 63 for upper microphone 64 is clogged (pattern A), sound collection hole 163 for lower microphone 164 is clogged (pattern B), or at least one of clogging of both of sound collection hole 63 for upper microphone 64 and sound collection hole 163 for lower microphone 164 (pattern C) and clogging of sound emission hole 53 for rear speaker 54 (pattern D) is established can be determined by outputting a sound from rear speaker 54 and detecting a volume of the sound input to upper microphone 64 and a volume of the sound input to lower microphone 164.

Though a sound is output from rear speaker 54 in an embodiment above, limitation thereto is not intended and a sound may be output from front speaker 154.

[Fourth Embodiment]

In an electronic device in a fourth embodiment, a clogged portion is narrowed down by outputting a sound from both of rear speaker 54 and front speaker 154.

Volume detector 22 can detect volume V21 of a sound input to lower microphone 164 during a period in which a test sound is output from rear speaker 54. Volume detector 22 can detect volume V22 of a sound input to lower microphone 164 during a period in which a test sound is output from front speaker 154.

When volume V21 is lower than prescribed threshold value THA and volume V22 is equal to or higher than prescribed threshold value THA, clogging determination unit 23 can determine that sound emission hole 53 for rear speaker 54 is clogged (a pattern a).

When volume V21 is equal to or higher than prescribed threshold value THA and volume V22 is lower than prescribed threshold value THA, clogging determination unit 23 can determine that sound emission hole 153 for front speaker 154 is clogged (a pattern b).

When volume V21 is lower than prescribed threshold value THA and volume V22 is lower than prescribed threshold value THA, clogging determination unit 23 can determine that at least one of a first pattern (a pattern c) in which both of sound emission hole 53 for rear speaker 54 and sound emission hole 153 for front speaker 154 are clogged and a second pattern (a pattern d) in which sound collection hole 163 for lower microphone 164 is clogged is established.

Figure 17:
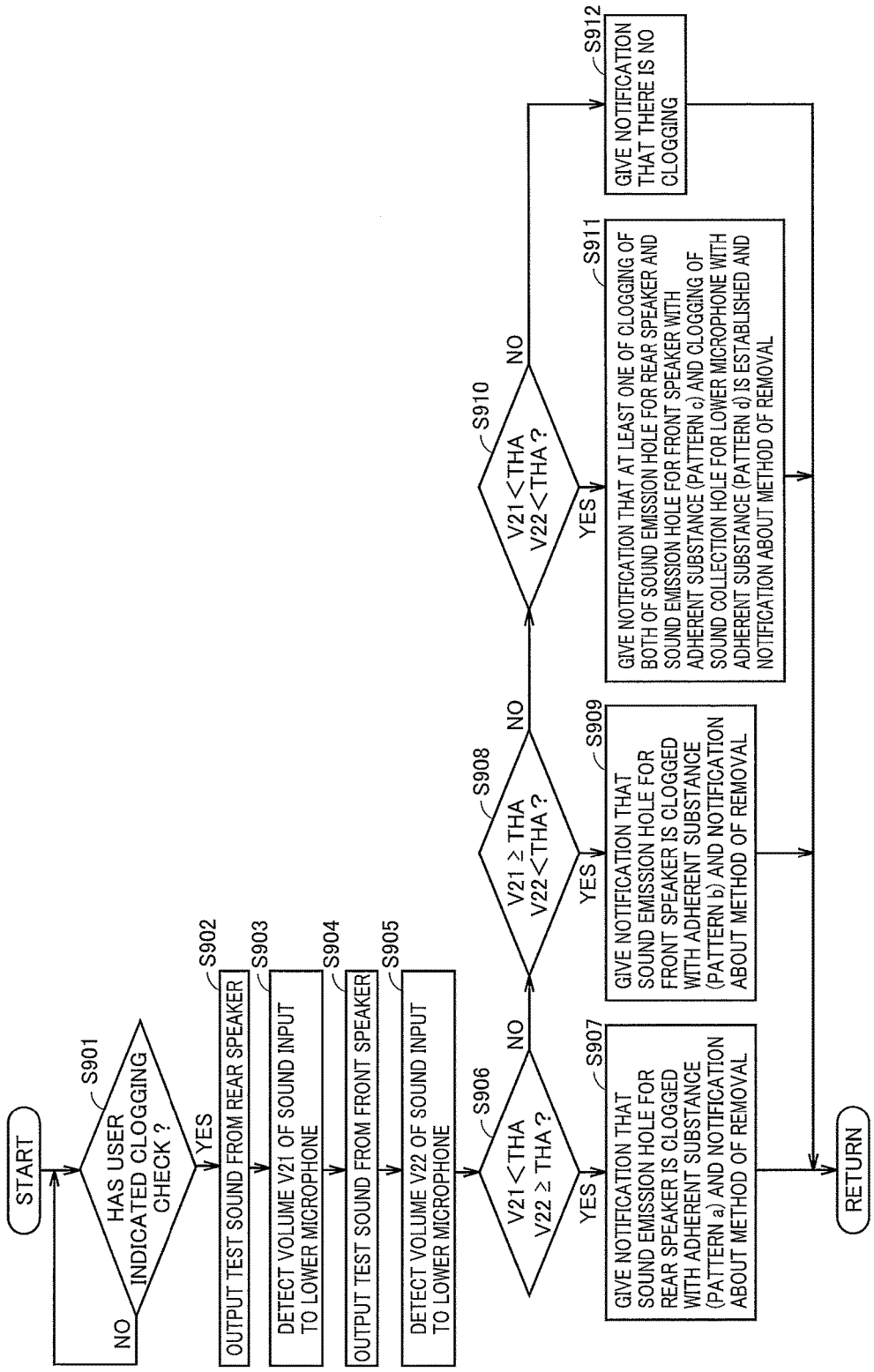
FIG. 17 is a flowchart showing a procedure of operations of the portable terminal in a fourth embodiment.

FIG. 17 is a flowchart showing a procedure of operations of portable terminal 1 in the fourth embodiment.

When a user indicates clogging check in step S901 by selecting a clogging check icon displayed on display 6 through touch panel 5, the process proceeds to step S902.

In step S902, test sound generator 21 can generate a test sound and can have rear speaker 54 output the test sound.

In step S903, volume detector 22 can detect volume V21 of a sound input to lower microphone 164.

In step S904, test sound generator 21 can generate a test sound and can have front speaker 154 output the test sound.

In step S905, volume detector 22 can detect volume V22 of a sound input to lower microphone 164.

When volume V21 is lower than prescribed threshold value THA and volume V22 is equal to or higher than prescribed threshold value THA in step S906, the process proceeds to step S907.

In step S907, notification unit 24 can have display 6 show a message giving a notification that sound emission hole 53 for rear speaker 54 is clogged with an adherent substance (pattern a) and a notification about a method of removing clogging.

When volume V21 is equal to or higher than prescribed threshold value THA and volume V22 is lower than prescribed threshold value THA in step S908, the process proceeds to step S909.

In step S909, notification unit 24 can have display 6 show a message giving a notification that sound emission hole 153 for front speaker 154 is clogged with an adherent substance (pattern b) and a notification about a method of removing clogging.

When volume V21 is lower than prescribed threshold value THA and volume V22 is lower than prescribed threshold value THA in step S910, the process proceeds to step S911.

In step S911, notification unit 24 can have display 6 show a message giving a notification that at least one of clogging of sound emission hole 53 for rear speaker 54 and sound emission hole 153 for front speaker 154 with an adherent substance (pattern c) and clogging of sound collection hole 163 for lower microphone 164 with an adherent substance (pattern d) is established and a notification about a method of removing clogging.

When volume V21 is equal to or higher than prescribed threshold value THA and volume V22 is equal to or higher than prescribed threshold value THA in step S910, the process proceeds to step S912.

In step S912, notification unit 24 can have display 6 show a message giving a notification that sound emission hole 53 for rear speaker 54, sound emission hole 153 for front speaker 154, and sound collection hole 163 for lower microphone 164 are not clogged.

As set forth above, according to the fourth embodiment, whether sound emission hole 53 for rear speaker 54 is clogged (pattern a), sound emission hole 153 for front speaker 154 is clogged (pattern b), or at least one of clogging of both of sound emission hole 53 for rear speaker 54 and sound emission hole 153 for front speaker 154 (pattern c) and clogging of sound collection hole 163 for lower microphone 164 (pattern d) is established can be determined by outputting a sound from rear speaker 54 and front speaker 154 and detecting a volume of the sound input to lower microphone 164.

Though a volume of a sound input to lower microphone 164 is detected in an embodiment above, limitation thereto is not intended and a volume of a sound input to upper microphone 64 may be detected.

[Fifth Embodiment]

A portable terminal in a fifth embodiment detects whether or not a sound collection hole for a microphone is clogged, based on a volume of voice and sound uttered by a user and input to the microphone during telephone conversation, instead of a test sound.

Volume detector 22 can detect a volume of a sound input to lower microphone 164 during telephone conversation.

Clogging determination unit 23 can determine whether or not sound collection hole 163 for lower microphone 164 is clogged, based on the detected volume.

Figure 18:
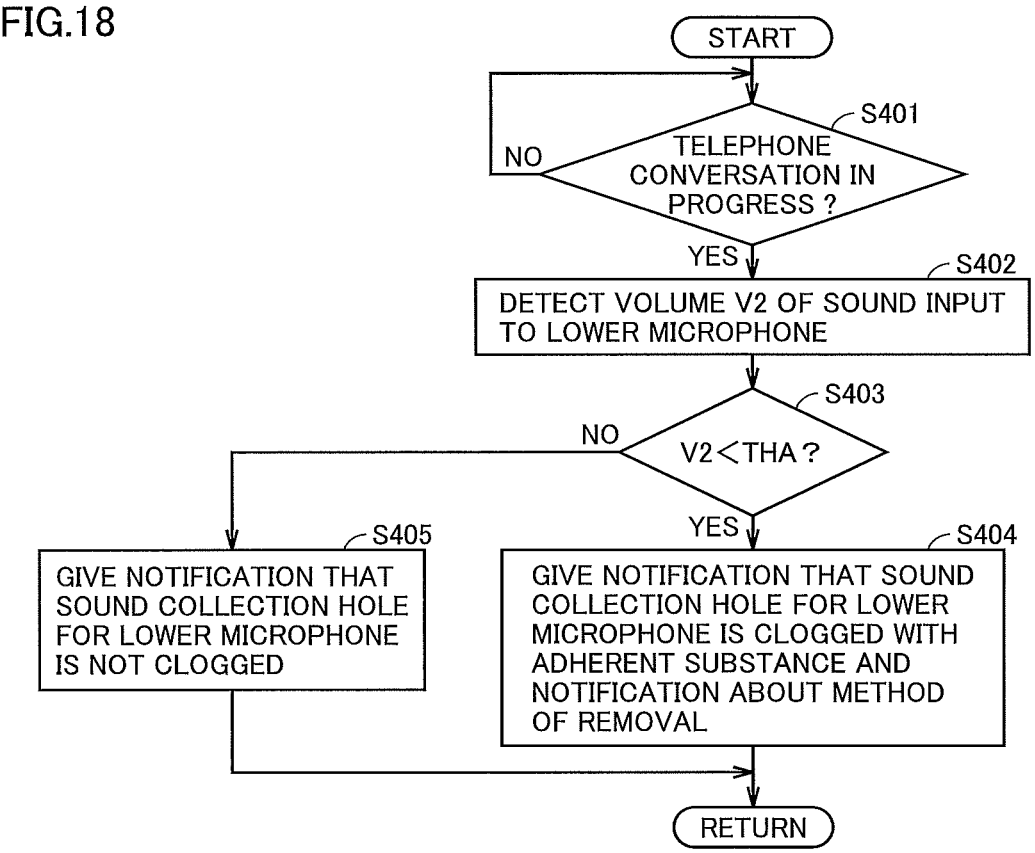
FIG. 18 is a flowchart showing a procedure of operations of the portable terminal in a fifth embodiment.

FIG. 18 is a flowchart showing a procedure of operations of portable terminal 1 in the fifth embodiment.

Referring to FIG. 18, when telephone conversation is in progress by means of radio communication unit 14 of portable terminal 1 in step S401, the process proceeds to step S402.

In step S402, volume detector 22 can detect volume V2 of a sound input to lower microphone 164.

When volume V2 is lower than prescribed threshold value THA in step S403, the process proceeds to step S404, and when volume V2 is equal to or higher than prescribed threshold value THA, the process proceeds to step S405.

In step S404, notification unit 24 can have display 6 show a message giving a notification that sound collection hole 163 for lower microphone 164 is clogged with an adherent substance and a notification about a method of removing clogging.

In step S405, notification unit 24 can have display 6 show a message giving a notification that sound collection hole 163 for lower microphone 164 is not clogged.

As set forth above, according to the portable terminal in the fifth embodiment, whether or not sound collection hole 163 for lower microphone 164 is clogged can be determined based on comparison between a volume of a sound input to lower microphone 164 during telephone conversation and a prescribed threshold value.

[Sixth Embodiment]

In a sixth embodiment, clogging determination unit 23 can determine whether or not a sound collection hole for a microphone is clogged, based on comparison between a volume of a sound input to a microphone during telephone conversation and a log of volumes during past telephone conversations.

Figure 19:
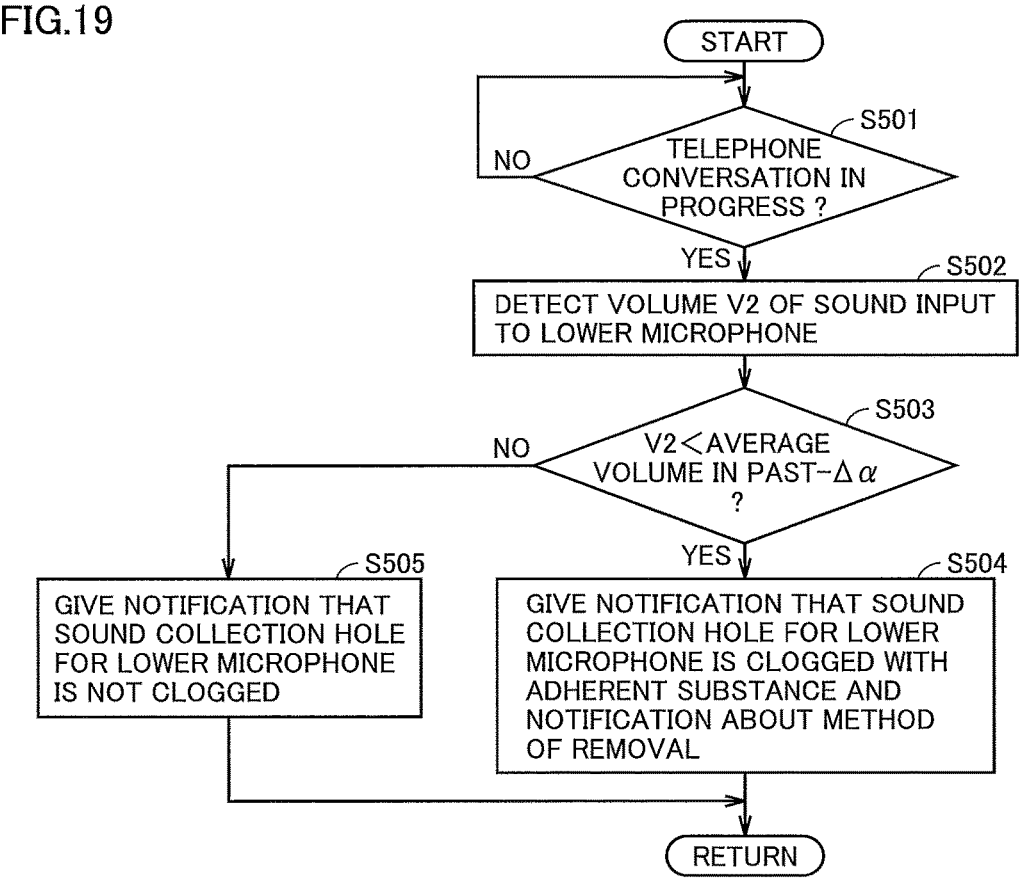
FIG. 19 is a flowchart showing a procedure of operations of the portable terminal in a sixth embodiment.

FIG. 19 is a flowchart showing a procedure of operations of portable terminal 1 in the sixth embodiment.

Referring to FIG. 19, when telephone conversation is in progress by means of radio communication unit 14 of portable terminal 1 in step S501, the process proceeds to step S502.

In step S502, volume detector 22 can detect volume V2 of a sound input to lower microphone 164.

When volume V2 is lower than a value calculated by subtracting a prescribed amount $\Delta\alpha$ from an average value of volumes of sounds input to lower microphone 164 during telephone conversations in the past in step S503, the process proceeds to step S504, and when volume V2 is equal to or higher than the value calculated by subtracting prescribed amount $\Delta\alpha$ from the average value of volumes of sounds input to lower microphone 164 during telephone conversations in the past, the process proceeds to step S505.

In step S504, notification unit 24 can have display 6 show a message giving a notification that sound collection hole 163 for lower microphone 164 is clogged with an adherent substance and a notification about a method of removing clogging.

In step S505, notification unit 24 can have display 6 show a message giving a notification that sound collection hole 163 for lower microphone 164 is not clogged.

As set forth above, according to the sixth embodiment, whether or not sound collection hole 163 for lower microphone 164 is clogged can be determined based on comparison between a volume of a sound input to lower microphone 164 during telephone conversation and volumes of sounds input to lower microphone 164 during telephone conversations in the past.

Though an embodiment above is on the premise that user's voice and sound is mainly input to lower microphone 164 during telephone conversation, loudness of a sound at a frequency of a human's voice among sounds input to a microphone is desirably detected when noise in the surroundings is loud.

[Seventh Embodiment]

In a portable terminal in a seventh embodiment, any of a normal telephone conversation mode and a handsfree telephone conversation mode is selected at the time of telephone conversation, and a sound can be output from a speaker in accordance with the selected mode and a sound can be input to a microphone in accordance with the selected mode.

In the normal telephone conversation mode, as in the sixth embodiment, volume detector 22 can detect a volume of a sound input to lower microphone 164 during telephone conversation, and clogging determination unit 23 can determine whether or not sound collection hole 163 for lower microphone 164 is clogged, based on the detected volume.

In the handsfree telephone conversation mode, volume detector 22 can detect a volume of a sound input to upper microphone 64 during a period in which no voice and sound on a conversation counterpart side is received by radio communication unit 14 during telephone conversation, and clogging determination unit 23 can determine whether or not sound collection hole 63 for upper microphone 64 is clogged, based on the detected volume.

Figure 20:
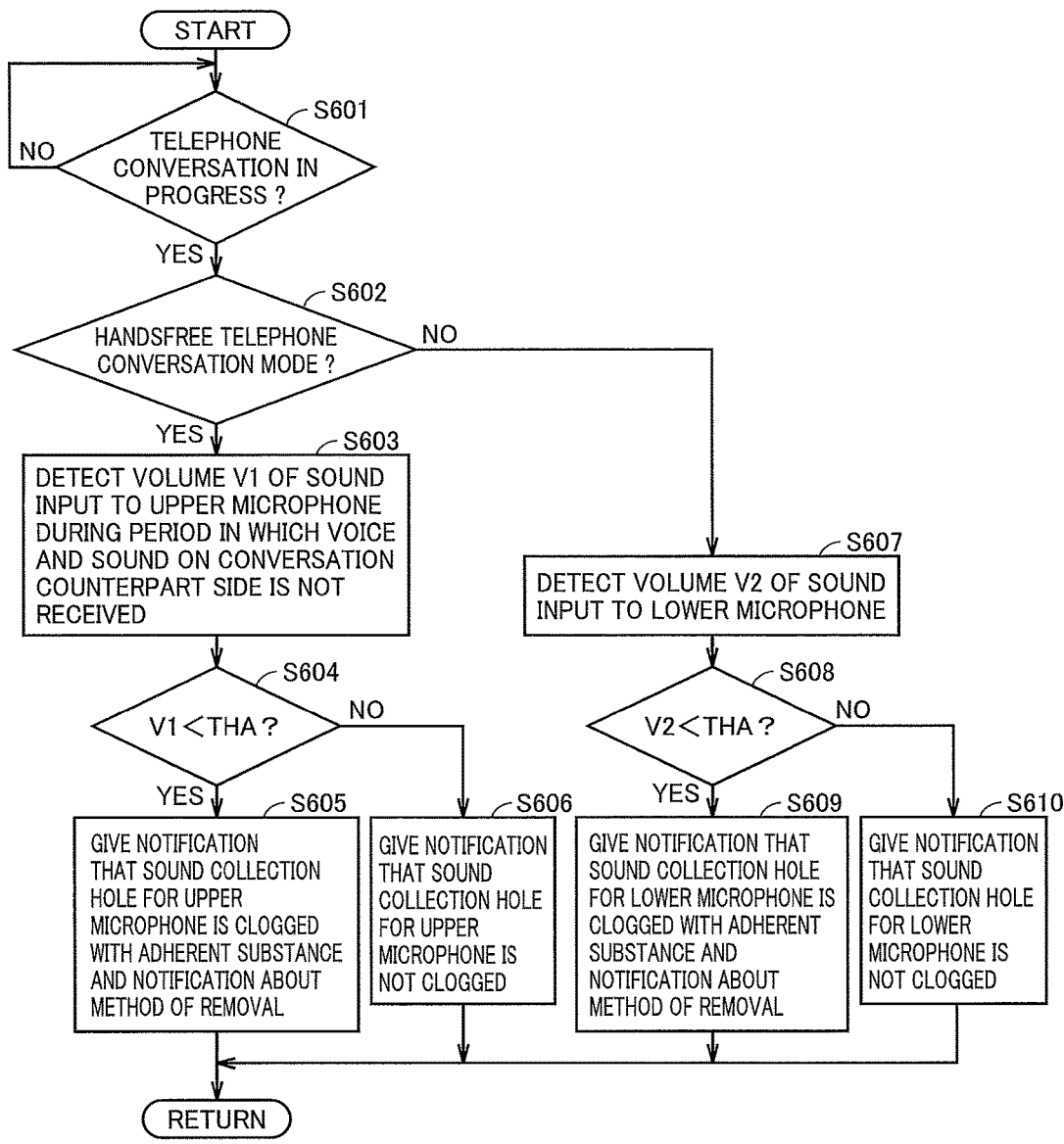
FIG. 20 is a flowchart showing a procedure of operations of the portable terminal in a seventh embodiment.

FIG. 20 is a flowchart showing a procedure of operations of portable terminal 1 in the seventh embodiment.

Referring to FIG. 20, when telephone conversation is in progress by means of radio communication unit 14 of portable terminal 1 in step S601, the process proceeds to step S602.

When the handsfree telephone conversation mode is set as the current telephone conversation mode in step S602, the process proceeds to step S603, and when the normal telephone conversation mode is set as the current telephone conversation mode, the process proceeds to step S607.

In step S603, volume detector 22 can detect volume V1 of a sound input to upper microphone 64 during a period in which no voice and sound on the conversation counterpart side is received by radio communication unit 14.

When volume V1 is lower than prescribed threshold value THA in step S604, the process proceeds to step S605, and when volume V1 is equal to or higher than prescribed threshold value THA, the process proceeds to step S606.

In step S605, notification unit 24 can have display 6 show a message giving a notification that sound collection hole 63 for upper microphone 64 is clogged with an adherent substance and a notification about a method of removing clogging.

In step S606, notification unit 24 can have display 6 show a message giving a notification that sound collection hole 63 for upper microphone 64 is not clogged.

In step S607, volume detector 22 can detect volume V2 of a sound input to lower microphone 164.

When volume V2 is lower than prescribed threshold value THA in step S608, the process proceeds to step S609, and when volume V2 is equal to or higher than prescribed threshold value THA, the process proceeds to step S610.

In step S609, notification unit 24 can have display 6 show a message giving a notification that sound collection hole 163 for lower microphone 164 is clogged with an adherent substance and a notification about a method of removing clogging.

In step S610, notification unit 24 can have display 6 show a message giving a notification that sound collection hole 163 for lower microphone 164 is not clogged.

As set forth above, according to the seventh embodiment, whether or not sound collection hole 163 for lower microphone 64 is clogged can be determined also in the handsfree telephone conversation mode.

Though an embodiment above is on the premise that user's voice and sound is mainly input to upper microphone 64 during a period in which no voice and sound on the conversation counterpart side is received during the handsfree telephone conversation mode, loudness of a sound at a frequency of human's voice among sounds input to the microphone is desirably detected when noise in the surroundings is loud.

[Eighth Embodiment]

In the third embodiment, only candidates for a clogged portion can be specified in step S310 in FIG. 16. In an eighth embodiment, a clogged portion can clearly be specified among candidates specified in step S310 in which clogging may be present.

Figure 21:
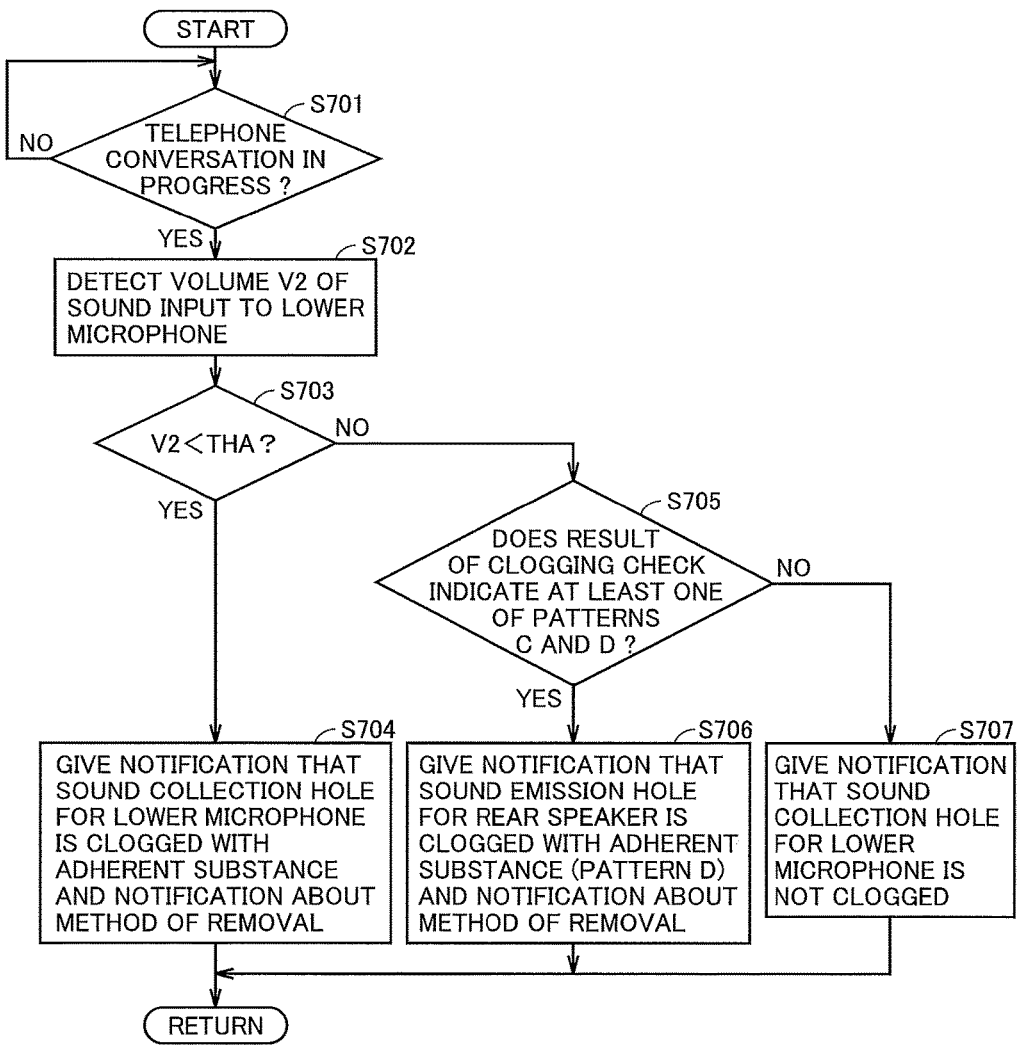
FIG. 21 is a flowchart showing a procedure of operations of the portable terminal in an eighth embodiment.

FIG. 21 is a flowchart showing a procedure of operations of portable terminal 1 in the eighth embodiment.

Referring to FIG. 21, when telephone conversation is in progress by means of radio communication unit 14 of portable terminal 1 in step S701, the process proceeds to step S702.

In step S702, volume detector 22 can detect volume V2 of a sound input to lower microphone 164.

When volume V2 is lower than prescribed threshold value THA in step S703, the process proceeds to step S704, and when volume V2 is equal to or higher than prescribed threshold value THA, the process proceeds to step S705.

In step S704, notification unit 24 can have display 6 show a message giving a notification that sound collection hole 163 for lower microphone 164 is clogged with an adherent substance and a notification about a method of removing clogging.

In step S705, when a result of clogging check performed in the procedure shown in FIG. 16 is determined in step S705 as at least one of clogging of both of sound collection hole 63 for upper microphone 64 and sound collection hole 163 for lower microphone 164 with an adherent substance (pattern C) and clogging of sound emission hole 53 for rear speaker 54 with an adherent substance (pattern D), the process proceeds to step S706, and when a result of determination other than the result of determination above is given, the process proceeds to step S707.

In step S706, notification unit 24 can have display 6 show a message giving a notification that sound emission hole 53 for rear speaker 54 is clogged with an adherent substance (pattern D) and a notification about a method of removing clogging.

In step S707, notification unit 24 can have display 6 show a message giving a notification that sound collection hole 163 for lower microphone 164 is not clogged.

[Ninth Embodiment]

In the fourth embodiment, only candidates for a clogged portion can be specified in step S911 in FIG. 17. In a ninth embodiment, a clogged portion can clearly be specified among candidates specified in step S911 in which clogging may be present.

Figure 22:
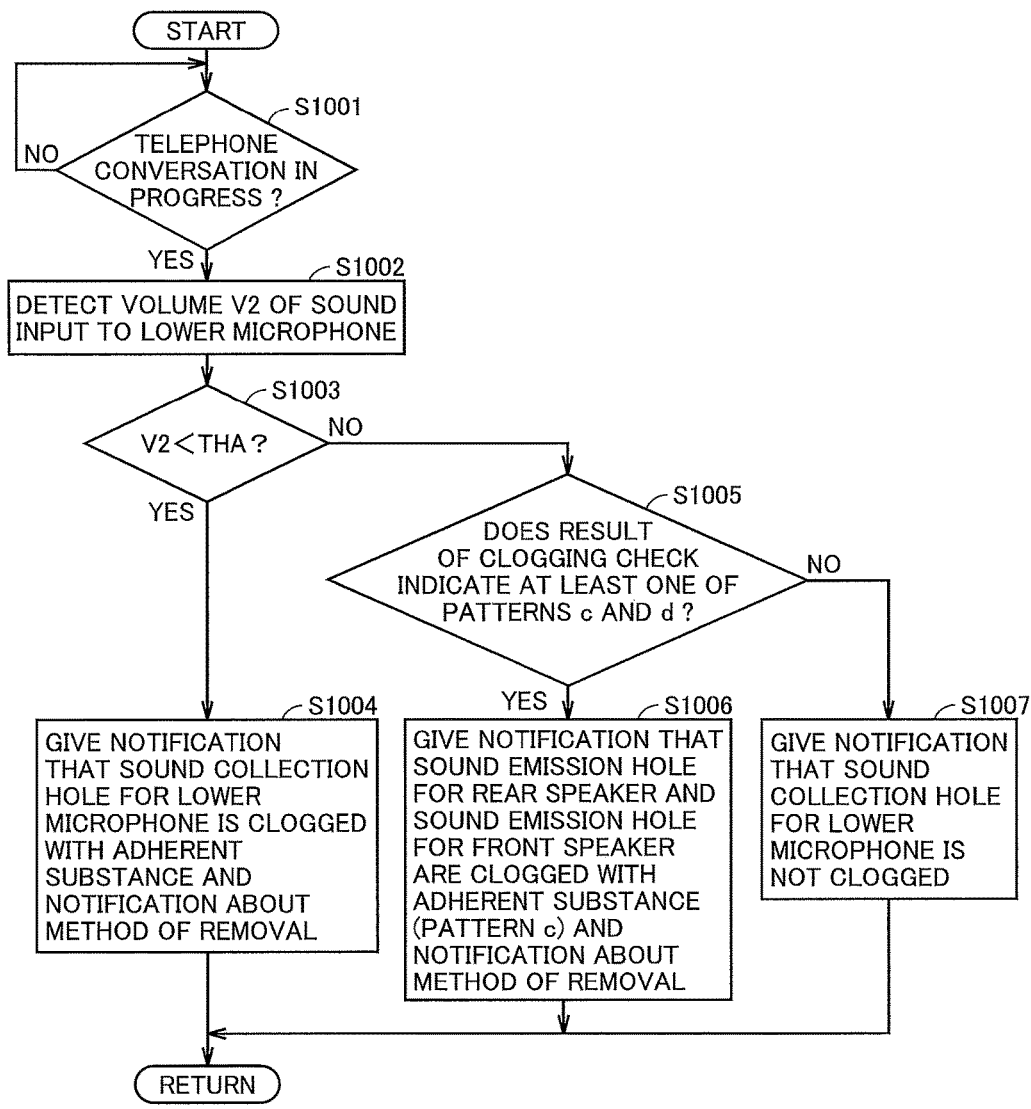
FIG. 22 is a flowchart showing a procedure of operations of the portable terminal in a ninth embodiment.

FIG. 22 is a flowchart showing a procedure of operations of portable terminal 1 in the ninth embodiment.

Referring to FIG. 22, when telephone conversation is in progress by means of radio communication unit 14 of portable terminal 1 in step S1001, the process proceeds to step S1002.

In step S1002, volume detector 22 can detect volume V2 of a sound input to lower microphone 164.

When volume V2 is lower than prescribed threshold value THA in step S1003, the process proceeds to step S1004, and when volume V2 is equal to or higher than prescribed threshold value THA, the process proceeds to step S1005.

In step S1004, notification unit 24 can have display 6 show a message giving a notification that sound collection hole 163 for lower microphone 164 is clogged with an adherent substance and a notification about a method of removing clogging.

When a result of clogging check performed in the procedure shown in FIG. 17 is determined in step S1005 as at least one of clogging of sound emission hole 53 for rear speaker 54 and sound emission hole 153 for front speaker 154 with an adherent substance (pattern c) and clogging of sound collection hole 163 for lower microphone 164 with an adherent substance (pattern d), the process proceeds to step S1006, and when a result of determination other than the result of determination above is given, the process proceeds to step S1007.

In step S1006, notification unit 24 can have display 6 show a message giving a notification that sound emission hole for rear speaker 54 and sound emission hole 153 for front speaker 154 are clogged with an adherent substance (pattern c) and a notification about a method of removing clogging.

In step S1007, notification unit 24 can have display 6 show a message giving a notification that sound collection hole 163 for lower microphone 164 is not clogged.

[Tenth Embodiment]

A portable terminal in a tenth embodiment can determine whether or not an adherent substance is present on a surface of a speaker.

Figure 23:
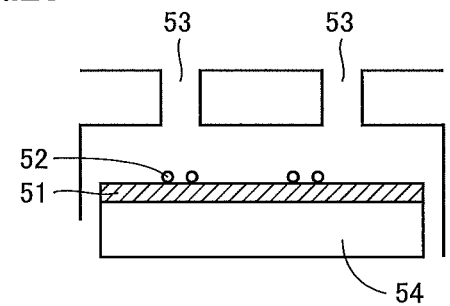
FIG. 23 is a diagram showing a state that an adherent substance is present on the rear speaker.

FIG. 23 is a diagram showing a state that an adherent substance is present on rear speaker 54.

Adherent substance 52 may adhere to a vibration sheet 51 which forms rear speaker 54. When an adherent substance is present on a vibration sheet 51, frequency characteristics of a sound output from rear speaker 54 vary as compared with a normal condition that there is no adherent substance.

Figure 24:
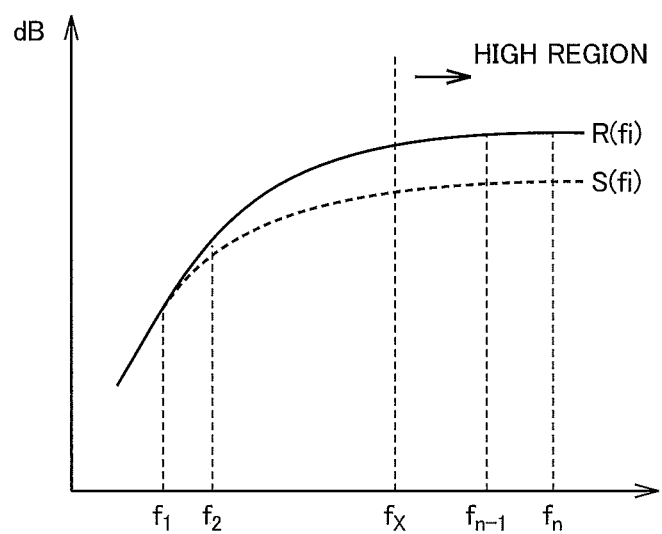
FIG. 24 is a diagram showing one example of frequency characteristics of a sound output from the rear speaker.

FIG. 24 is a diagram showing one example of frequency characteristics of a sound output from rear speaker 54.

In FIG. 24, R(fi) represents a volume (dB) at a frequency fi in a normal condition. S(fi) represents a volume (dB) at frequency fi while an adherent substance is present on vibration sheet 51. With a frequency fx or higher being defined as a high region, the high region has such characteristics that a volume while an adherent substance is present is lower than a volume in the normal condition.

Test sound generator 21 can generate a test sound including only each of a plurality of frequencies as a frequency component and can have rear speaker 54 output the test sound.

Figure 25:
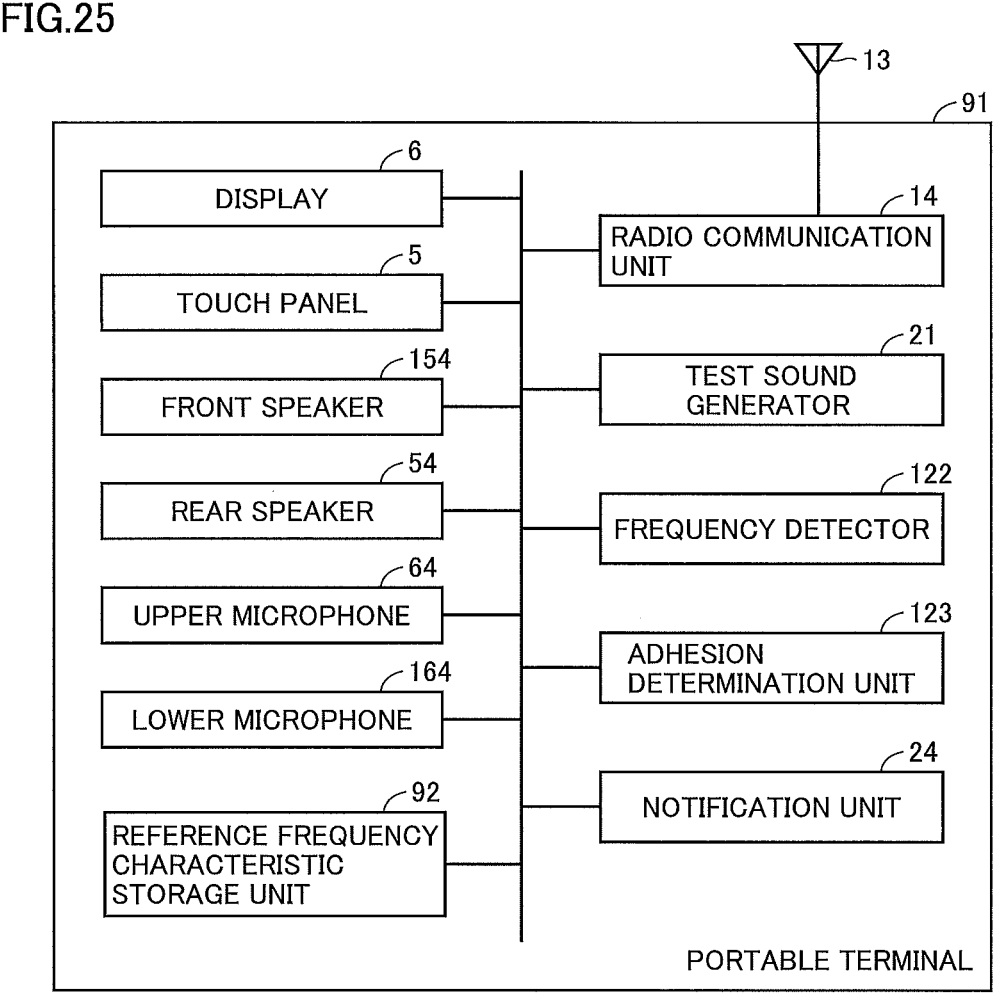
FIG. 25 is a diagram showing a configuration of a portable terminal in a tenth embodiment.

FIG. 25 is a diagram showing a configuration of a portable terminal 91 in the tenth embodiment.

Portable terminal 91 includes a frequency characteristic detector 122 and an adhesion determination unit 123 instead of volume detector 22 and clogging determination unit 23 included in portable terminal 1. Portable terminal 91 further includes a reference frequency characteristic storage unit 92.

Frequency characteristic detector 122 can detect frequency characteristics of a sound input to upper microphone 64. Specifically, frequency characteristic detector 122 can detect a volume of a sound at each frequency input to upper microphone 64 during a period in which a test sound containing only each frequency of the plurality of frequencies as a frequency component is output.

Reference frequency characteristic storage unit 92 is configured to store reference volumes of sounds at a plurality of frequencies. The reference volume refers to a volume while no adherent substance is present on vibration sheet 51 of rear speaker 54, and is represented by R1 to Rn in FIG. 24.

Adhesion determination unit 123 can determine whether or not an adherent substance is present on a surface of rear speaker 54, based on the detected volumes at the plurality of frequencies and the reference volumes at the plurality of frequencies stored in the storage unit.

For example, as shown in an expression (1), adhesion determination unit 123 can determine whether or not an adherent substance is present on the surface of rear speaker 54 when the sum of squares of the difference between the reference volume and the detected volume exceeds a prescribed value THB in the high region in which a frequency is equal to or higher than fx.

Figure 26:
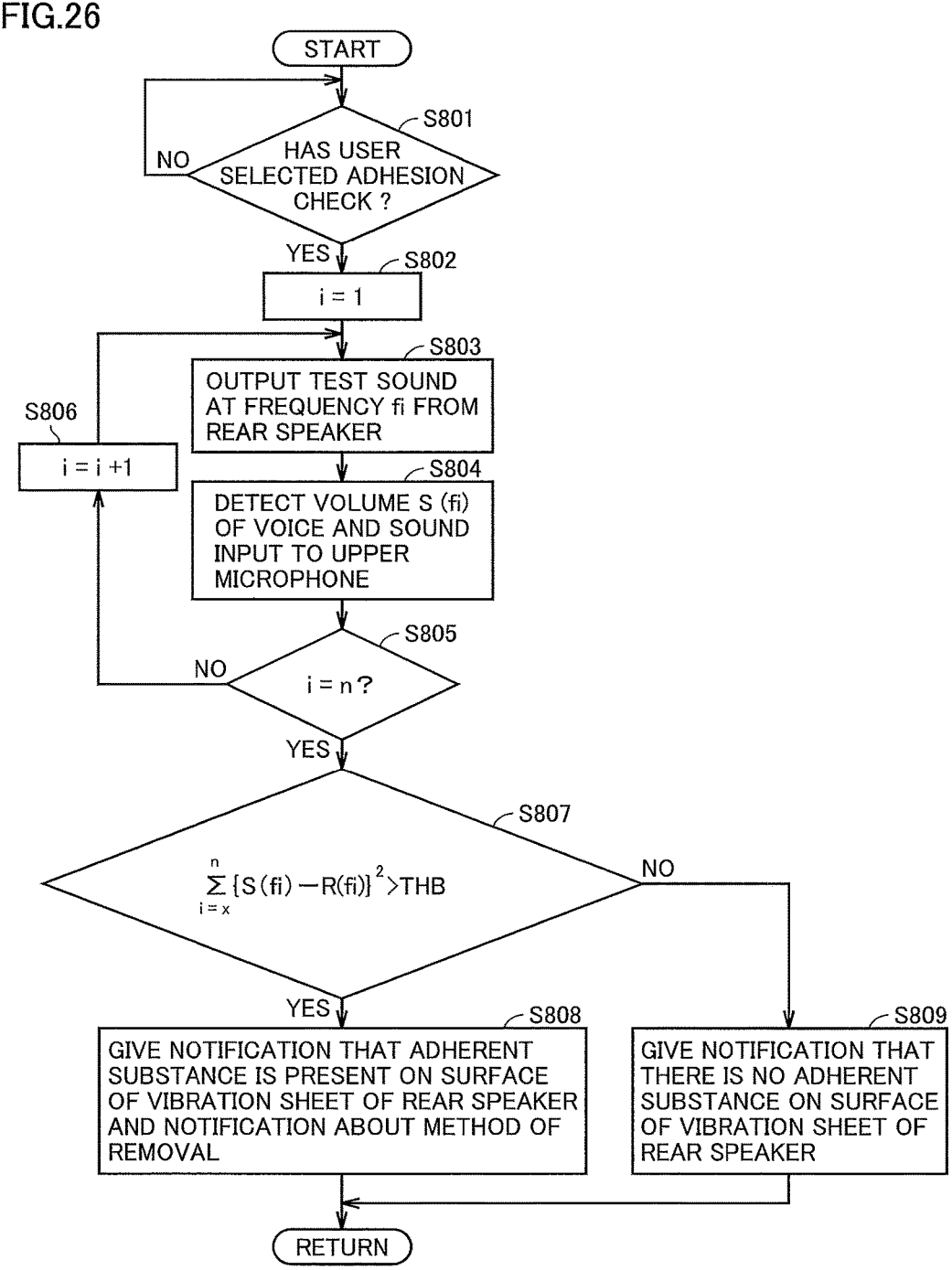
FIG. 26 is a flowchart showing a procedure of operations in the portable terminal in the tenth embodiment.
Figure 27:
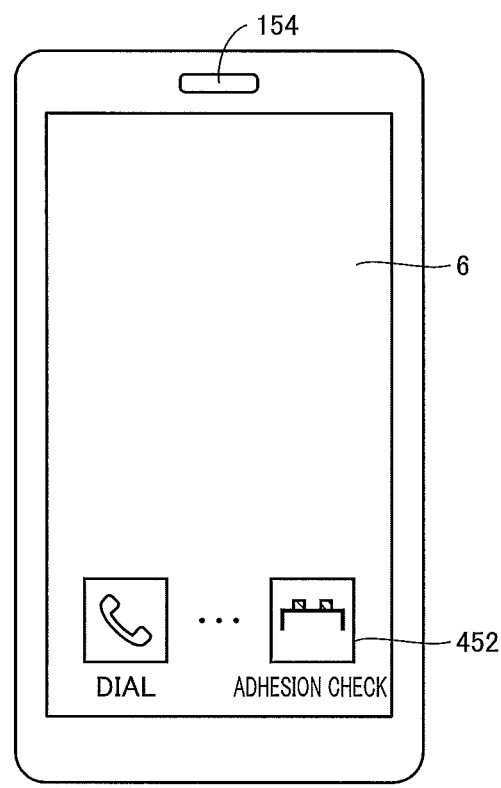
FIG. 27 is a diagram showing an icon for a user to indicate adhesion check.
Figure 28:
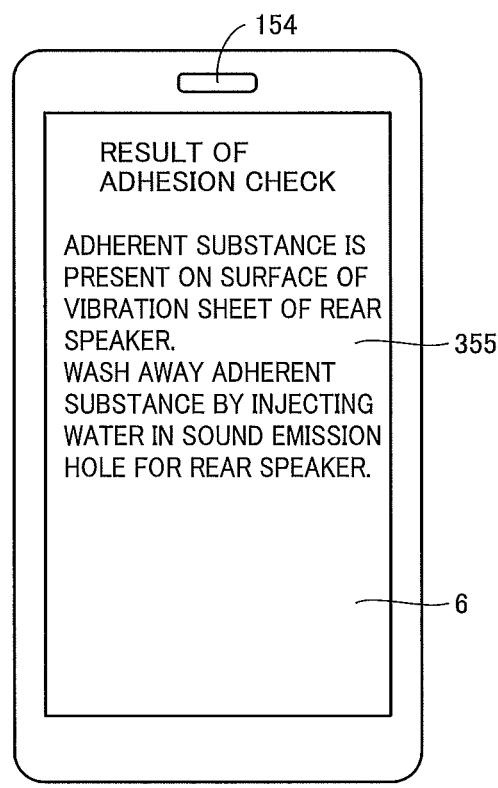
FIGS. 28 and 29 are diagrams showing examples of results of adhesion check.
Figure 29:
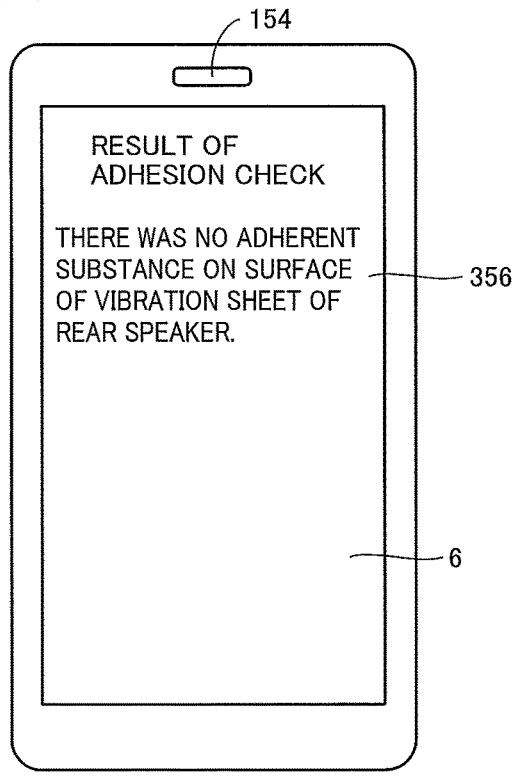

FIG. 26 is a flowchart showing a procedure of operations in portable terminal 1 in the tenth embodiment. FIG. 27 is a diagram showing an icon for a user to indicate adhesion check. FIGS. 28 and 29 are diagrams showing examples of results of adhesion check.

Referring to FIG. 26, when the user indicates adhesion check in step S801 by selecting an adhesion check icon 452 displayed on display 6 as shown in FIG. 27 through touch panel 5, the process proceeds to step S802.

In step S802, a control variable i can be set to 1.

In step S803, test sound generator 21 can generate a test sound at frequency fi and can have rear speaker 54 output the test sound.

In step S804, frequency characteristic detector 122 can detect a volume S (fi) of the sound input to upper microphone 64.

When control variable i is set to n in step S805, the process proceeds to step S807, and when control variable i is not set to n, the process proceeds to step S806.

In step S806, control variable i is incremented and the process returns to step S803.

When the sum of square means of reference volume R (fi) and detected volume S (fi) exceeds prescribed value THB in the high region in which a frequency is equal to or higher than fx as shown in the expression (1), the process proceeds to step S808.

When the sum of mean squares of the difference between reference volume R (fi) and detected volume S (fi) is equal to or lower than prescribed value THB in the high region in which a frequency is equal to or higher than fx, the process proceeds to step S809.

$$\frac{1}{n-x+1} \sum_{i=x}^{n} \{S(fi) - R(fi)\}^2 > THB \qquad (1)$$

In step S808, as shown in FIG. 28, notification unit 24 can have display 6 show a message 355 giving a notification that an adherent substance adheres to a surface of vibration sheet 51 of rear speaker 54 and a notification about a method of removing the adherent substance. In the method of removing an adherent substance, for example, as shown in FIG. 28, washing away by injecting water in sound emission hole 53 for rear speaker 54 may be indicated.

In step S809, as shown in FIG. 29, notification unit 24 can have display 6 show a message 356 giving a notification that no adherent substance is present on the surface of vibration sheet 51 of rear speaker 54.

As set forth above, according to the portable terminal in the tenth embodiment, frequency characteristics of a sound output to the outside of housing 90 from rear speaker 54 can be detected by detecting test sounds at a plurality of frequencies output from rear speaker 54 with upper microphone 64. The portable terminal can determine whether or not an adherent substance is present on the surface of rear speaker 54 based on comparison between the detected frequency characteristics and the frequency characteristics during a normal operation.

Though detection of an adherent substance to the rear speaker is described in an embodiment above, limitation thereto is not intended. An adherent substance on the front speaker, an adherent substance on the upper microphone, and an adherent substance on the lower microphone can also be detected similarly to the above.

[Modification of Tenth Embodiment]

Figure 30:
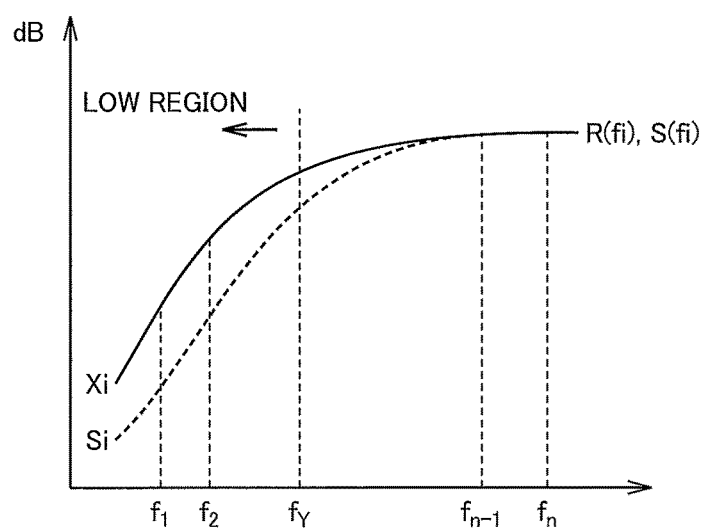
FIG. 30 is a diagram showing another example of frequency characteristics of a sound output from the rear speaker.

FIG. 30 is a diagram showing another example of frequency characteristics of a sound output from rear speaker 54.

In FIG. 30, R(fi) represents a volume (dB) at frequency fi in the normal condition. S(fi) represents a volume (dB) at frequency fi while an adherent substance is present on vibration sheet 51. With a frequency fy or lower being defined as a low region, the low region has such characteristics that a volume while an adherent substance is present is lower than a volume in the normal condition.

As shown in an expression (2), adhesion determination unit 123 can determine whether or not an adherent substance is present on the surface of rear speaker 54 when the sum of mean squares of a difference between the reference volume and a detected volume exceeds a prescribed value THC in the low region in which the frequency is equal to or lower than fy.

$$\frac{1}{y} \sum_{i=1}^{n} \{S(fi) - R(fi)\}^2 > THC \qquad (2)$$

(Modification)

The present disclosure is not limited to embodiments above. The present disclosure includes, for example, a modification as below.

(1) Method of Removal

In embodiments above, removal with a pointed tool such as a needle or a toothpick has been indicated as shown in FIG. 12 as a method of removing clogging in a sound emission hole and a sound collection hole, however, limitation thereto is not intended. For example, washing away by injecting water in a sound emission hole and a sound collection hole may be carried out.

A cover for a housing may be removed and washing away with water may be carried out in removing clogging of a sound emission hole, clogging of a sound collection hole, and an adherent substance on the surface of a speaker.

(2) Construction for Blocking Entry of Substance into Housing.

When some of a plurality of substances adhere to a speaker and frequency characteristics of the speaker vary, a filter can be used to block entry of some substances.

Figure 31:
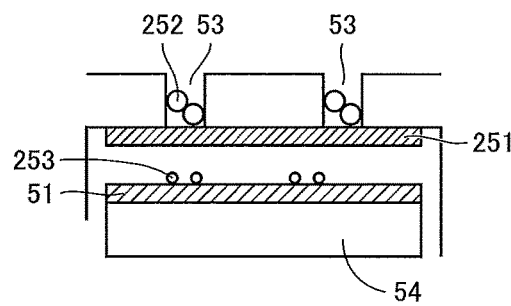
FIG. 31 is a diagram showing a construction in which a sound emission hole for the rear speaker is provided with a filter.

FIG. 31 is a diagram showing a construction in which sound emission hole 53 for rear speaker 54 is provided with a filter 251.

Filter 251 is between sound emission hole 53 and rear speaker 54. Filter 251 is implemented, for example, by a cellophane membrane (a semipermeable membrane). Filter 251 can filter out particles based on a size of the particles. Though the filter can allow passage of particles 253 having a size smaller than a certain level among particles which entered sound emission hole 53, it does not allow passage of particles 252 having a size equal to or greater than the certain level. For example, when a portable terminal is used under the sea and thereafter washed with a cleaning solution in which a detergent has been dissolved, sea water and the cleaning solution are present together in sound emission hole 53 Here, sea water which is a solution of small particles such as sodium chloride passes through filter 251 and the cleaning solution corresponding to a colloid solution does not pass through filter 251. Thus, a substance which adheres to vibration sheet 51 can be particles 253 alone. By which substance contamination is brought about can be clarified by providing filter 251, detecting a volume from a speaker, for example, with a microphone, and further detecting frequency characteristics of different sounds from the speaker with the microphone.

(3) Cleaning Using Piezoelectric Element

Figure 32:
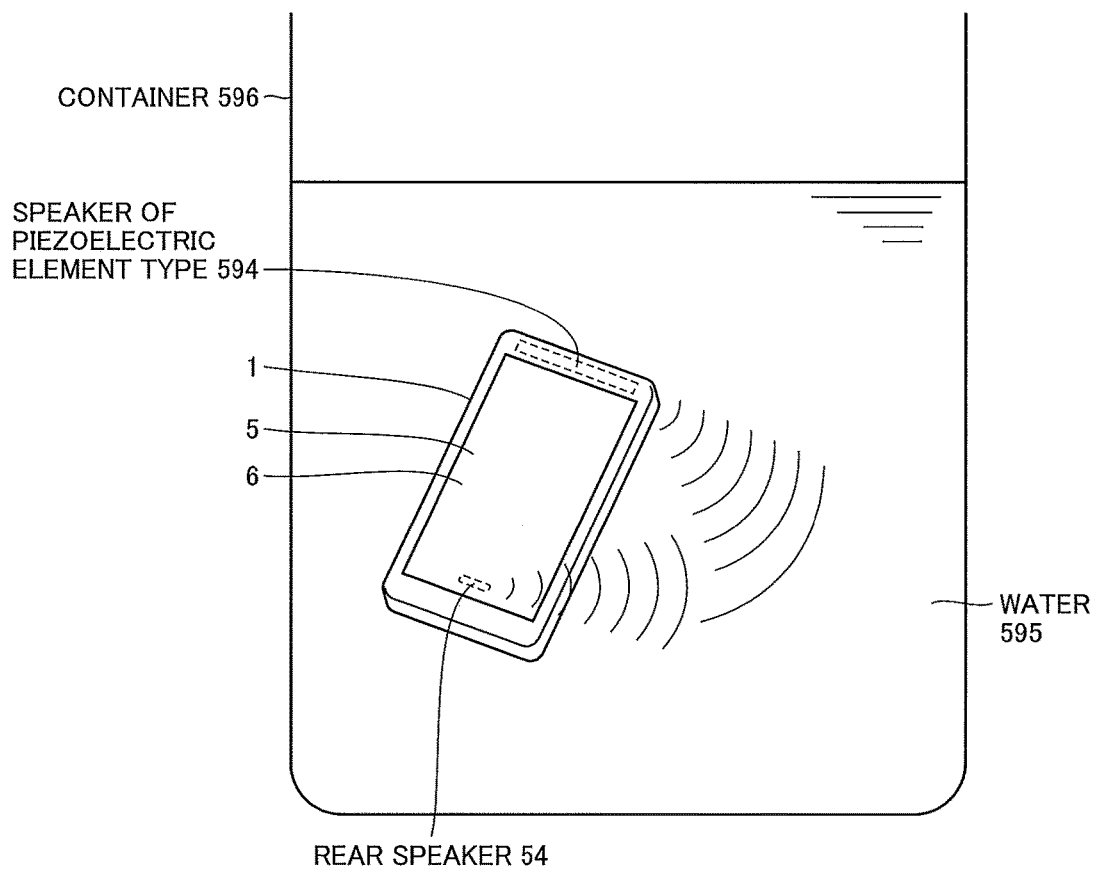
FIG. 32 is a diagram for illustrating a method of cleaning the rear speaker by making use of vibration of a speaker of a piezoelectric element type.

FIG. 32 is a diagram for illustrating a method of cleaning rear speaker 54 by making use of vibration by a speaker of a piezoelectric element type.

A speaker 594 of a piezoelectric element type is vibrated by immersing portable terminal 1 in water 595 in a container 596. This vibration is transmitted through water 595 to vibration sheet 51 of rear speaker 54, and a substance which adheres to vibration sheet 51 can be removed.

Speaker 594 of the piezoelectric element type may vibrate in response to selection by a user of a menu, or may automatically vibrate as it is immersed in water.

(4) Noise in Surroundings

Though first to fourth embodiments are on the premise that only a test sound output from a speaker is input to a microphone, a test sound at a specific frequency may be output from the speaker and loudness of a sound at a specific frequency input to the microphone may be detected when noise in the surroundings is loud.

Though embodiments have been described, it should be understood that embodiments disclosed herein are illustrative and non-restrictive in every respect. The scope of the present disclosure is defined by the terms of the claims and is intended to include any modifications within the scope and meaning equivalent to the terms of the claims.

The invention claimed is:

1. An electronic device comprising:
   a plurality of microphones, each of the plurality of microphones comprising a sound collection hole;
   a plurality of speakers, each of the plurality of speakers comprising a sound emission hole;
   a test sound generator configured to generate a test sound and have a selected speaker output the test sound;
   an input unit configured to allow selection by a user of one microphone from the plurality of microphones and one speaker from the plurality of speakers, wherein the test sound generator causes the selected speaker output the test sound; and
   at least one processor,
   the at least one processor being configured to
      detect a volume of a sound input to the selected microphone,
      determine whether at least one of the sound emission hole for the selected speaker and a sound collection hole for the selected microphone is clogged, based on the detected volume, and
      give a notification about a result of determination.

2. The electronic device according to claim 1, wherein the at least one processor is configured to determine whether there is clogging, based on comparison between the detected volume and a prescribed threshold value.

3. The electronic device according to claim 1, the electronic device comprising a first microphone and a second microphone, wherein the at least one processor is configured to detect a volume of a sound input to the first microphone as a first volume and detect a volume of a sound input to the second microphone as a second volume while the test sound is output, and
   the at least one processor is configured to
      determine that a sound collection hole for the second microphone is clogged when the first volume is equal to or higher than a prescribed threshold value and the second volume is lower than the prescribed threshold value,
      determine that a sound collection hole for the first microphone is clogged when the first volume is lower than the prescribed threshold value and the second volume is equal to or higher than the prescribed threshold value, and
      determine that at least one of a first pattern in which both of the sound collection hole for the first microphone and the sound collection hole for the second microphone are clogged and a second pattern in which a sound emission hole for the speaker is clogged is established when the first volume is lower than the prescribed threshold value and the second volume is lower than the prescribed threshold value.

4. The electronic device according to claim 1, the electronic device comprising a first speaker and a second speaker, wherein the at least one processor is configured to detect a volume of a sound input to the microphone as a first volume while the test sound is output from the first speaker and detect a volume of a sound input to the microphone as a second volume while the test sound is output from the second speaker, and
   the at least one processor is configured to
      determine that a sound emission hole for the second speaker is clogged when the first volume is equal to or higher than a prescribed threshold value and the second volume is lower than the prescribed threshold value,
      determine that a sound emission hole for the first speaker is clogged when the first volume is lower than the prescribed threshold value and the second volume is equal to or higher than the prescribed threshold value, and
      determine that at least one of a first pattern in which both of the sound emission hole for the first speaker and the sound emission hole for the second speaker are clogged and a second pattern in which a sound collection hole for the microphone is clogged is established when the first volume is lower than the prescribed threshold value and the second volume is lower than the prescribed threshold value.

5. The electronic device according to claim 1, the electronic device comprising a communication unit configured to communicate for telephone conversation, wherein the at least one processor is configured to detect a volume of a sound input to the microphone during telephone conversation, and
   the at least one processor is configured to determine whether the sound collection hole for the microphone is clogged, based on the detected volume.

6. The electronic device according to claim 5, wherein the at least one processor is configured to determine whether there is clogging, based on comparison between the detected volume and a prescribed threshold value.

7. The electronic device according to claim 5, wherein the at least one processor is configured to determine whether there is clogging, based on comparison between the detected volume and a volume detected in past.

8. The electronic device according to claim 5, wherein the at least one processor is configured to detect a volume of a sound input to the microphone while no voice and sound is received from a conversation counterpart side during handsfree telephone conversation.

9. The electronic device according to claim 1, wherein the at least one processor is configured to give a notification that instructs a user of at least one technique for removing clogging.

10. An electronic device comprising:
a plurality of microphones, each of the plurality of microphones comprising a sound collection hole;
a plurality of speakers, each of the plurality of speakers comprising a sound emission hole;
a test sound generator configured to generate a test sound and have the speaker output the test sound;
an input unit configured to allow selection by a user of one microphone from the plurality of microphones and one speaker from the plurality of speakers, wherein the test sound generator causes the selected speaker output the test sound; and
the at least one processor being configured to
detect frequency characteristics of the sound input to the selected microphone,
determine whether an adherent substance is present on a surface of the selected speaker, based on the detected frequency characteristics, and
give a notification about a result of determination.

11. The electronic device according to claim 10, the electronic device comprising:
a storage unit configured to store reference volumes of sounds at a plurality of frequencies; and
a test sound generator configured to generate a test sound having only each of the plurality of frequencies as a frequency component and to have the speaker output the test sound, wherein
the at least one processor is configured to detect a volume of a sound at each frequency input to the microphone while the test sound having each frequency as the frequency component is output, and
the at least one processor is configured to determine whether the adherent substance is present, based on the detected volumes at the plurality of frequencies and the stored reference volumes at the plurality of frequencies.

12. The electronic device according to claim 10, wherein the at least one processor is configured to give a notification that instructs a user of at least one technique for removing the adherent substance.

* * * * *